United States Patent
Venkatesan et al.

(10) Patent No.: US 11,330,086 B2
(45) Date of Patent: *May 10, 2022

(54) APPARATUS, SYSTEM AND METHOD OF NEGOTIATING A RANGE MEASUREMENT PROTOCOL

(71) Applicant: INTEL IP CORPORATION, Santa Clara, CA (US)

(72) Inventors: Ganesh Venkatesan, Hillsboro, OR (US); Chittabrata Ghosh, Fremont, CA (US); Jonathan Segev, Tel Mond (IL)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/793,235

(22) Filed: Feb. 18, 2020

(65) Prior Publication Data
US 2020/0186627 A1   Jun. 11, 2020

Related U.S. Application Data

(63) Continuation of application No. 15/672,565, filed on Aug. 9, 2017, now Pat. No. 10,609,187.
(Continued)

(51) Int. Cl.
*H04L 29/06* (2006.01)
*H04L 69/24* (2022.01)
*H04W 4/02* (2018.01)

(52) U.S. Cl.
CPC .............. *H04L 69/24* (2013.01); *H04W 4/02* (2013.01)

(58) Field of Classification Search
CPC ................................ H04L 69/24; H04W 4/02
See application file for complete search history.

(56) References Cited

U.S. PATENT DOCUMENTS 9,974,040 B1   5/2018   Chu et al.
10,609,187 B2 *  3/2020   Venkatesan ............. H04L 69/24
(Continued)

OTHER PUBLICATIONS

IEEE Std 802.11™—2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.
(Continued)

*Primary Examiner* — Redentor Pasia
(74) *Attorney, Agent, or Firm* — Shichrur & Co.

(57) ABSTRACT

Some demonstrative embodiments include apparatuses, systems and/or methods of negotiating a range measurement protocol. For example, an initiator station may be configured to transmit a negotiation request message to a responder station and receive a negotiation response message from the responder station to negotiate a range measurement protocol to perform a range measurement procedure with the responder station, the negotiation request message including an initiator protocol element including an indication of one or more initiator range measurement protocols supported by the initiator station, the negotiation response message including a compatibility indication to indicate whether or not at least one of the initiator range measurement protocols is compatible with at least one responder range measurement protocol supported by the responder station; and based on the compatibility indication, select to perform the range measurement procedure with the responder station or to abort communication with the responder station.

18 Claims, 9 Drawing Sheets

Related U.S. Application Data

(60) Provisional application No. 62/372,413, filed on Aug. 9, 2016.

(56) References Cited

U.S. PATENT DOCUMENTS

| | | | | |
|---|---|---|---|---|
| 2015/0049716 | A1* | 2/2015 | Gutierrez | H04W 56/001 370/329 |
| 2015/0094103 | A1* | 4/2015 | Wang | H04W 4/023 455/456.6 |
| 2015/0296552 | A1* | 10/2015 | Huang | H04W 4/023 370/252 |
| 2015/0341750 | A1* | 11/2015 | Hayes | H04W 64/003 370/328 |
| 2015/0365835 | A1 | 12/2015 | Segev et al. | |
| 2016/0021560 | A1* | 1/2016 | Reshef | H04W 24/10 370/338 |
| 2016/0044524 | A1* | 2/2016 | Ben-Haim | H04W 24/10 370/252 |
| 2016/0119805 | A1 | 4/2016 | Aldana et al. | |
| 2016/0241373 | A1 | 8/2016 | Marri Sridhar et al. | |
| 2016/0255471 | A1 | 9/2016 | Marri Sridhar et al. | |
| 2016/0366548 | A1* | 12/2016 | Wang | H04W 4/023 |
| 2016/0366578 | A1 | 12/2016 | Abraham et al. | |
| 2017/0134978 | A1 | 5/2017 | Vamaraju et al. | |
| 2017/0171833 | A1 | 6/2017 | Vamaraju et al. | |
| 2017/0188191 | A1 | 6/2017 | Aldana et al. | |
| 2017/0230856 | A1 | 8/2017 | Vamaraju et al. | |
| 2017/0238135 | A1* | 8/2017 | Vamaraju | H04W 56/0015 455/456.1 |
| 2017/0251332 | A1* | 8/2017 | Aldana | G01S 5/0009 |
| 2017/0273044 | A1* | 9/2017 | Alsina | H04L 67/104 |
| 2017/0310570 | A1 | 10/2017 | Aldana et al. | |
| 2017/0353981 | A1 | 12/2017 | Lee et al. | |
| 2018/0048742 | A1 | 2/2018 | Venkatesan et al. | |
| 2018/0255599 | A1* | 9/2018 | Chau | H04W 76/16 |
| 2019/0289603 | A1* | 9/2019 | Yong | H04W 76/14 |
| 2020/0314792 | A1* | 10/2020 | Wang | H04B 7/063 |

OTHER PUBLICATIONS

IEEE Std 802.11ad™—2012. IEEE Standard for Information technology—Telecommunications and information exchange between systems Local and metropolitan area networks—Specific requirements Part 11: Wireless LAN Medium Access Control (MAC) and Physical Layer (PHY) Specifications Amendment 3: Enhancements for Very High Throughput in the 60 GHz Band, Dec. 28, 2012, 628 pages.

IEEE Std 802.11ac™—2013. IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 4: Enhancements for Very High Throughput for Operation in Bands below 6 GHz, Dec. 11, 2013, 424 pages.

Office Action for U.S. Appl. No. 15/672,565, dated Mar. 7, 2019, 26 pages.

Office Action for U.S. Appl. No. 15/672,565, dated Jul. 25, 2019, 21 pages.

Notice of Allowance for U.S. Appl. No. 15/672,565, dated Nov. 18, 2019, 10 Pages.

* cited by examiner

210 - Negotiation Phase
220 - Protocol-A
230 – Protocol-B
240 - Protocol-C

APPARATUS, SYSTEM AND METHOD OF NEGOTIATING A RANGE MEASUREMENT PROTOCOL

CROSS REFERENCE

This Application claims the benefit of and priority from U.S. Provisional Patent Application No. 62/372,413 entitled "GENERALIZED PROTOCOL TO NEGOTIATE CAPABILITIES TO FACILITATE EXECUTION OF TIME-SENSITIVE PROTOCOLS BETWEEN UNASSOCIATED WIRELESS PEERS", filed Aug. 9, 2016, the entire disclosure of which is incorporated herein by reference.

TECHNICAL FIELD

Embodiments described herein generally relate to negotiating a range measurement protocol.

BACKGROUND

Some wireless communication systems may include one or more mobile stations, e.g., initiator stations, and one or more wireless devices, e.g., responders, which may perform a measurement of a range between the initiator station and responder stations using a Fine Timing Measurement (FTM) protocol.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
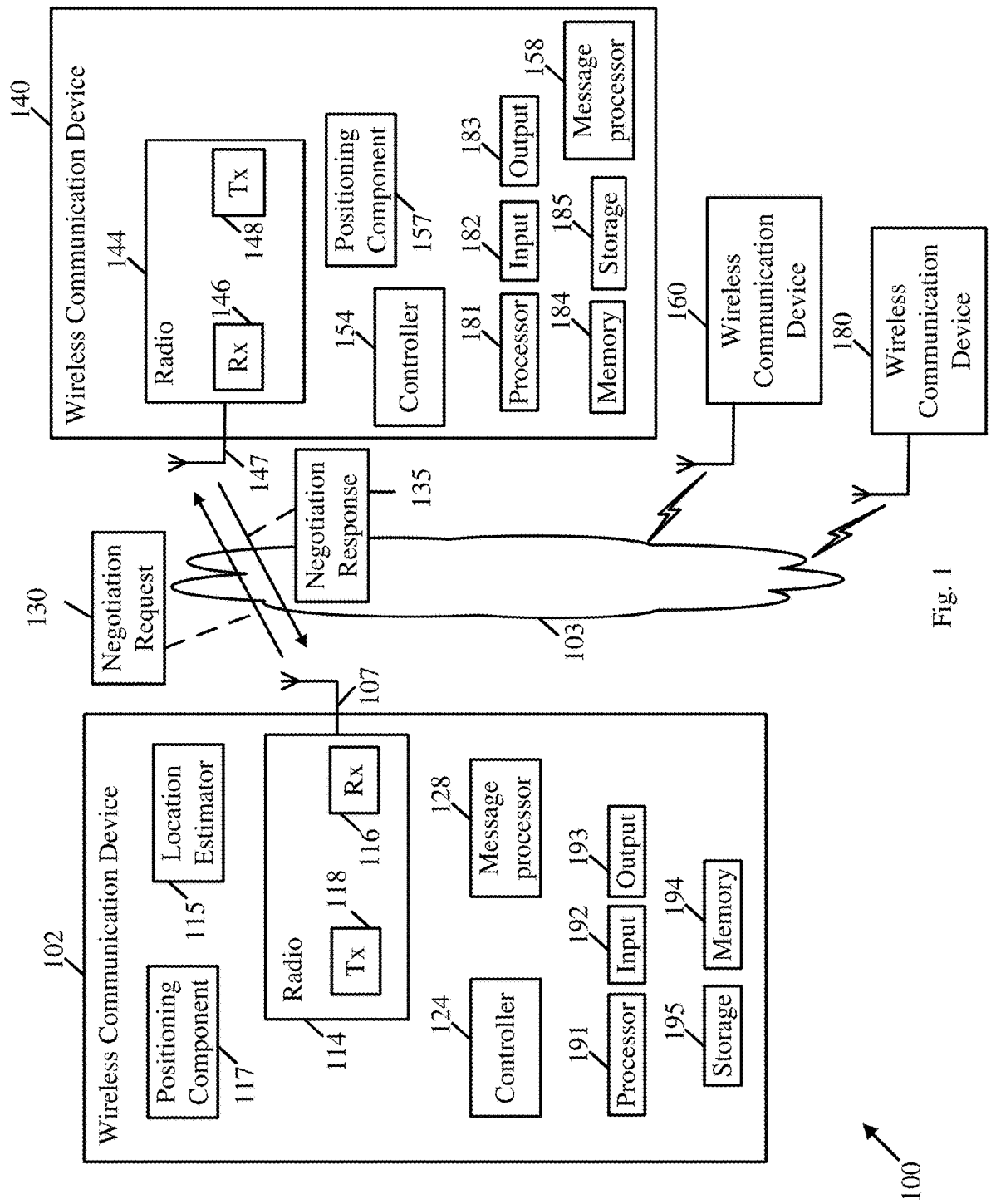
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a sensor device, an Internet of Things (IoT) device, a wearable device, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (including IEEE 802.11-2016

(*IEEE 802.11-2016, IEEE Standard for Information technology—Telecommunications and information exchange between systems Local and metropolitan area networks—Specific requirements Part 11: Wireless LAN Medium Access Control (MAC) and Physical Layer (PHY) Specifications*, Dec. 7, 2016); IEEE 802.11az (*IEEE 802.11az: Next Generation Positioning*); IEEE802.11ay (*P802.11ay Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications—Amendment: Enhanced Throughput for Operation in License-Exempt Bands Above 45 GHz*)) and/or future versions and/or derivatives thereof, devices and/or networks operating in accordance with existing WiFi Alliance (WFA) Peer-to-Peer (P2P) specifications (including *WiFi P2P technical specification*, version 1.5, Aug. 4, 2015) and/or future versions and/or derivatives thereof, devices and/or networks operating in accordance with existing Wireless-Gigabit-Alliance (WGA) specifications (including *Wireless Gigabit Alliance, Inc WiGig MAC and PHY Specification* Version 1.1, April 2011, Final specification) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), Spatial Divisional Multiple Access (SDMA), FDM Time-Division Multiplexing (TDM), Time-Division Multiple Access (TDMA), Multi-User MIMO (MU-MIMO), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments may be used in conjunction with a WLAN, e.g., a WiFi network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 2.4 GHz or 5 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHZ, a WLAN frequency band, a WPAN frequency band, and the like.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and/or the like. Logic may be executed by one or more processors using memory, e.g., registers, buffers, stacks, and the like, coupled to the one or more processors, e.g., as necessary to execute the logic.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

Some demonstrative embodiments are described herein with respect to WiFi communication. However, other embodiments may be implemented with respect to any other communication scheme, network, standard and/or protocol.

Reference is now made to FIG. 1, which schematically illustrates a block diagram of a system 100, in accordance with some demonstrative embodiments.

As shown in FIG. 1, in some demonstrative embodiments system 100 may include a wireless communication network including one or more wireless communication devices, e.g., wireless communication devices 102, 140, 160 and/or 180.

In some demonstrative embodiments, wireless communication devices 102, 140, 160 and/or 180 may include, for example, a UE, an MD, a STA, an AP, a PC, a desktop computer, a mobile computer, a laptop computer, an Ultrabook™ computer, a notebook computer, a tablet computer, a server computer, a handheld computer, a handheld device, an Internet of Things (IoT) device, a sensor device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, devices 102, 140, 160 and/or 180 may include, operate as, perform a role of, and/or perform one or more functionalities of, one or more STAs. For example, device 102 may include at least one STA, and/or device 140 may include at least one STA.

In some demonstrative embodiments, devices 102, 140, 160 and/or 180 may include, operate as, perform a role of, and/or perform one or more functionalities of, one or more WLAN STAs.

In some demonstrative embodiments, devices 102, 140, 160 and/or 180 may include, operate as, perform a role of, and/or perform one or more functionalities of, one or more Wi-Fi STAs.

In some demonstrative embodiments, devices 102, 140, 160 and/or 180 may include, operate as, perform a role of, and/or perform one or more functionalities of, one or more BT devices.

In some demonstrative embodiments, devices 102, 140, 160 and/or 180 may include, operate as, perform a role of, and/or perform one or more functionalities of, one or more Neighbor Awareness Networking (NAN) STAs.

In some demonstrative embodiments, device 102 may include, operate as, and/or operate as, perform a role of, and/or perform one or more functionalities of, an initiator STA.

In some demonstrative embodiments, devices 140, 160 and/or 180 may include, operate as, perform a role of, and/or perform one or more functionalities of, one or more responder STAs.

In some demonstrative embodiments, one of wireless communication devices 102, 140, 160 and/or 180, e.g., device 140, may include, operate as, perform a role of, and/or perform one or more functionalities of, an AP STA, and/or one or more of wireless communication devices 102, 140, 160 and/or 180, e.g., device 102, 160 and/or 180, may include, operate as, perform a role of, and/or perform one or more functionalities of, a non-AP STA. In other embodiments, devices 102, 140, 160 and/or 180 may operate as, perform a role of, and/or perform one or more functionalities of, any other STA.

For example, the AP may include a router, a PC, a server, a Hot-Spot and/or the like.

For example, the AP may include a responder station, which may be configured to perform a range measurement procedure, for example, with an initiator station, e.g., station 102, e.g., as described below.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In one example, a non-access-point (non-AP) station (STA) may include a STA that is not contained within an AP. The non-AP STA may perform any other additional or alternative functionality.

In some demonstrative embodiments, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Devices 102, 140, 160 and/or 180 may optionally include other suitable hardware components and/or software components. In some demonstrative embodiments, some or all of the components of one or more of devices 102, 140, 160 and/or 180 may be enclosed in a common housing or packaging, and may be interconnected or operably associated using one or more wired or wireless links. In other embodiments, components of one or more of devices 102, 140, 160 and/or 180 may be distributed among multiple or separate devices.

In some demonstrative embodiments, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of device 102 and/or of one or more suitable applications. Processor 181 executes instructions, for example, of an Operating System (OS) of device 140 and/or of one or more suitable applications.

In some demonstrative embodiments, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 includes, for example, a monitor, a screen, a touch-screen, a flat panel display, a Light Emitting Diode (LED) display unit, an organic light-emitting diode (OLED) display unit, quantum dot light-emitting diode (QLED) display unit, a Liquid Crystal Display (LCD) display unit, a plasma display unit, one or more audio speakers or earphones, or other suitable output devices.

In some demonstrative embodiments, memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 includes, for example, a hard disk drive, a Solid State drive (SSD), a Flash drive, Network Attached Storage (NAS), a cloud storage device, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, wireless communication devices 102, 140, 160 and/or 180 may be capable of communicating content, data, information and/or signals via a wireless medium (WM) 103. In some demonstrative embodiments, wireless medium 103 may include, for example, a radio channel, a cellular channel, a Global Navigation Satellite System (GNSS) Channel, an RF channel, a WiFi channel, an IR channel, a Bluetooth (BT) channel, and the like.

In some demonstrative embodiments, wireless communication medium 103 may include a wireless communication channel over a 2.4 Gigahertz (GHz) frequency band, or a 5 GHz frequency band, a millimeterWave (mmWave) frequency band, e.g., a 60 GHz frequency band, a S1G band, and/or any other frequency band.

In some demonstrative embodiments, devices 102, 140, 160 and/or 180 may include one or more radios including circuitry and/or logic to perform wireless communication between devices 102, 140, 160, 180 and/or one or more other wireless communication devices. For example, device 102 may include a radio 114, and/or device 140 may include a radio 144.

In some demonstrative embodiments, radios 114 and/or 144 may include one or more wireless receivers (Rx) including circuitry and/or logic to receive wireless communication signals, RF signals, frames, blocks, transmission streams, packets, messages, data items, and/or data. For example, radio 114 may include at least one receiver 116, and/or radio 144 may include at least one receiver 146.

In some demonstrative embodiments, radios 114 and/or 144 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118, and/or radio 144 may include at least one transmitter 148.

In some demonstrative embodiments, radio 114 and/or radio 144, transmitters 118 and/or 148, and/or receivers 116 and/or 146 may include circuitry and/or logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radio 114 and/or radio 144 may include or may be implemented as part of a wireless Network Interface Card (NIC), and the like.

In some demonstrative embodiments, radios 114 and/or 144 may be configured to communicate over a 2.4 GHz band, a 5 GHz band, an mmWave band, a S1G band, and/or any other band.

In some demonstrative embodiments, radios 114 and/or 144 may include, or may be associated with, one or more antennas 107 and/or 147, respectively.

In one example, device 102 may include a single antenna 107. In another example, device 102 may include two or more antennas 107.

In one example, device 140 may include a single antenna 147. In another example, device 140 may include two or more antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, device 102 may include a controller 124, and/or device 140 may include a controller 154. Controller 124 may be configured to perform and/or to trigger, cause, instruct and/or control device 102 to perform, one or more communications, to generate and/or communicate one or more messages and/or transmissions, and/or to perform one or more functionalities, operations and/or procedures between devices 102, 140, 160, 180 and/or one or more other devices; and/or controller 154 may be configured to perform, and/or to trigger, cause, instruct and/or control device 140 to perform, one or more communications, to generate and/or communicate one or more messages and/or transmissions, and/or to perform one or more functionalities, operations and/or procedures between devices 102, 140, 160, 180 and/or one or more other devices, e.g., as described below.

In some demonstrative embodiments, controllers 124 and/or 154 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, baseband (BB) circuitry and/or logic, a BB processor, a BB memory, Application Processor (AP) circuitry and/or logic, an AP processor, an AP memory, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein.

In some demonstrative embodiments, at least part of the functionality of controller 124 may be implemented as part of one or more elements of radio 114, and/or at least part of the functionality of controller 154 may be implemented as part of one or more elements of radio 144.

In other embodiments, the functionality of controller 124 may be implemented as part of any other element of device 102, and/or the functionality of controller 154 may be implemented as part of any other element of device 140.

In some demonstrative embodiments, device 102 may include a message processor 128 configured to generate, process and/or access one or more messages communicated by device 102.

In one example, message processor 128 may be configured to generate one or more messages to be transmitted by device 102, and/or message processor 128 may be configured to access and/or to process one or more messages received by device 102, e.g., as described below.

In some demonstrative embodiments, device 140 may include a message processor 158 configured to generate, process and/or access one or more messages communicated by device 140.

In one example, message processor 158 may be configured to generate one or more messages to be transmitted by device 140, and/or message processor 158 may be configured to access and/or to process one or more messages received by device 140, e.g., as described below.

In some demonstrative embodiments, message processors 128 and/or 158 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, BB circuitry and/or logic, a BB processor, a BB memory, AP circuitry and/or logic, an AP processor, an AP memory, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 144.

In some demonstrative embodiments, at least part of the functionality of message processor 128 may be implemented as part of controller 124, and/or at least part of the functionality of message processor 158 may be implemented as part of controller 154.

In other embodiments, the functionality of message processor 128 may be implemented as part of any other element of device 102, and/or the functionality of message processor 158 may be implemented as part of any other element of device 140.

In some demonstrative embodiments, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other embodiments, controller 124, message processor 128 and/or radio 114 may be implemented by one or more additional or alternative elements of device 102.

In some demonstrative embodiments, at least part of the functionality of controller 154 and/or message processor 158 may be implemented by an integrated circuit, for example, a chip, e.g., a System on Chip (SoC). In one example, the chip or SoC may be configured to perform one or more functionalities of radio 144. For example, the chip or SoC may include one or more elements of controller 154, one or more elements of message processor 158, and/or one or more elements of radio 144. In one example, controller 154, message processor 158, and radio 144 may be implemented as part of the chip or SoC.

In other embodiments, controller 154, message processor 158 and/or radio 144 may be implemented by one or more additional or alternative elements of device 140.

In some demonstrative embodiments, device 102, device 140, device 160 and/or device 180 may include, operate as, perform the role of, and/or perform one or more functionalities of, one or more STAs. For example, device 102 may include at least one STA, device 140 may include at least one STA, device 160 may include at least one STA, and/or device 180 may include at least one STA.

In some demonstrative embodiments, wireless communication devices 102, 140, 160, and/or 180 may form, or may communicate as part of, a wireless local area network (WLAN).

In some demonstrative embodiments, wireless communication devices 102, 140, 160, and/or 180 may form, or may communicate as part of, a WiFi network.

In some demonstrative embodiments, devices 102, 140, 160, and/or 180 may be configured to perform one or more FTM measurements, ToF measurements, positioning measurements and/or communications, ranging measurements and/or communications, proximity measurements and/or communications, location estimation measurements and/or communications.

In some demonstrative embodiments, devices 102, 140, 160, and/or 180 may be configured to perform any other additional or alternative positioning measurements and/or communications, ranging measurements and/or communications, proximity measurements and/or communications, location estimation measurements and/or communications, for example, and/or according to any other additional or alternative procedure and/or protocol, e.g., an Received Signal Strength Indication (RSSI) procedure.

Some demonstrative embodiments are described below with respect to range measurements according to a range measurement procedure. However, other embodiments may be implemented with respect to any other additional or alternative positioning measurements and/or communications, ranging measurements and/or communications, proximity measurements and/or communications, location estimation measurements and/or communications according to any other additional or alternative procedure, protocol, and/or method.

In some demonstrative embodiments, devices 102, 140, 160, and/or 180 may be configured to perform one or more range measurements, for example, using WLAN communications, e.g., WiFi. For example, using WiFi to perform time based range measurements, e.g., FTM measurements and/or other range measurements, may enable, for example, increasing an indoor location accuracy of the mobile devices, e.g., in an indoor environment.

In some demonstrative embodiments, devices 102 may operate as, perform a role of, and/or perform one or more functionalities of, an initiator device (also referred to as "initiator STA"), and/or devices 140, 160 and/or 180 may operate as, perform a role of, and/or perform one or more functionalities of, one or more responder devices (also referred to as "responder STA"). For example, devices 140, 160, and/or 180 may include an AP STA, and/or device 102 may include a non-AP STA, for example, a mobile device, e.g., a Smartphone, which may perform a range measurement protocol with the APs, for example, to determine a location of the mobile device.

In some demonstrative embodiments, device 102 may include a positioning component 117, and/or device 140 may include a positioning component 157, which may be configured to perform one or more positioning measurements, operations and/or communications, e.g., as described below.

In some demonstrative embodiments, positioning components 117 and/or 157 may be configured to perform one or more operations and/or communications of ranging measurements according to one or more range measurement protocols, e.g., including one or more of the range measurement protocols described below. In other embodiments, positioning components 117 and/or 157 may be configured to perform one or more operations and/or communications of any other additional or alternative positioning measurement.

In some demonstrative embodiments, positioning components 117 and/or 157 may include, or may be implemented, using suitable circuitry and/or logic, e.g., controller circuitry and/or logic, processor circuitry and/or logic, memory circuitry and/or logic, and/or any other circuitry and/or logic, which may be configured to perform at least part of the functionality of positioning components 117 and/or 157. Additionally or alternatively, one or more functionalities of positioning components 117 and/or 157 may be implemented by logic, which may be executed by a machine and/or one or more processors, e.g., as described below.

In some demonstrative embodiments, positioning component 117 may be configured to perform one or more operations of, and/or at least part of the functionality of, message processor 128 and/or controller 124, for example, to trigger communication of one or more range measurement messages, for example, FTM messages and/or positioning packets, for example, Null-Data Packets (NDPs).

In some demonstrative embodiments, positioning component 157 may be configured to perform one or more operations of, and/or at least part of the functionality of, message processor 158 and/or controller 154, for example, to trigger communication of one or more range measurement messages, FTM messages and/or positioning packets, e.g., NDPs.

In some demonstrative embodiments, positioning components 117 and/or 157 may be configured to trigger the range measurements, for example, periodically and/or or upon a request from an application executed by a device, for example, to determine an accurate location of the device.

In some demonstrative embodiments, positioning components 117 and/or 157 may be configured to perform one or more measurements according to at least one range measurement protocol, e.g., as described below.

In some demonstrative embodiments, positioning components 117 and/or 157 may be configured to perform one or more proximity, ranging, and/or location estimation measurements, e.g., in an indoor location, based on the range measurements. For example, the range measurements may provide a relatively accurate estimation of location, range and/or proximity, e.g., in an indoor location.

Some demonstrative embodiments are described herein with respect to a positioning component, e.g., positioning components 117 and/or 157, configured to perform measurements according to a range measurement protocol and/or procedure. However, in other embodiments, the range measurement component may be configured to perform any other additional or alternative type of Time of Flight (ToF) measurements, ranging measurements, positioning measurements, proximity measurements, and/or location estimation measurements, e.g., according to any additional or alternative protocol and/or procedure.

In some demonstrative embodiments, devices 102, 140, 160, and/or 180 may be configured to utilize a range measurement protocol, for example, to measure the RTT from a STA implemented by device 102 to a plurality of other STAs, e.g., including devices 140, 160 and/or 180, for example, including one or more AP STAs and/or non-AP STAs.

In some demonstrative embodiments, devices 102, 140, 160 and/or 180 may be configured to negotiate one or more capabilities, for example, to facilitate execution of one or more protocols, e.g., time-sensitive protocols, between devices 102, 140, 160 and/or 180, for example, even at an unassociated mode between unassociated wireless peers, e.g., as described below.

In some demonstrative embodiments, the one or more protocols may include one or more range measurement protocols, e.g., as described below. However, in other embodiments, devices 102, 140, 160 and/or 180 may be configured to perform one or more of the operations and/or functionalities described herein to negotiate one or more other additional or alternative protocols, e.g., one or more other time-sensitive protocols and/or any other protocols to perform any other additional or alternative procedure.

In some demonstrative embodiments, devices 102, 140, 160 and/or 180 may be configured to perform one or more of the operations and/or functionalities described herein to negotiate one or more protocols, for example, to enable to solve at least a technical problem, for example, to allow wireless devices to exchange information with each other in order to, for example, learn each other's capabilities. For example, the capabilities may include may include one or more of a Very High Throughput (VHT) Sounding capability, High Efficiency Wi-Fi (HEW) Sounding Capability, a 60 GHz capability, and/or one or more additional or alternative capabilities, e.g., as described below.

In some demonstrative embodiments, devices 102, 140, 160 and/or 180 may be configured to perform one or more of the operations and/or functionalities described herein to negotiate one or more protocols, for example, to enable to solve at least a technical problem, for example, to allow wireless devices to negotiate one or more, e.g., a set of, protocol-specific parameters, e.g., parameters specific to VHT-Sounding, HEW-Sounding, and/or one or more other protocols, which may enable, for example, a technical advantage of efficient execution of one or more protocol, e.g., as described below. For example, the protocol parameters may include, an allocation of sounding-ids (identifiers), designating timeslots for protocol response from the peer, and/or one or more additional or alternative parameters, e.g., as described below.

In some demonstrative embodiments, devices 102, 140, 160 and/or 180 may be configured to perform one or more of the operations and/or functionalities described herein to negotiate one or more protocols, for example, to enable to solve at least a technical problem, for example, to allow wireless devices to, e.g., upon discovery of matching capabilities and negotiated protocol-specific parameters, execute one or more protocol exchanges, for example, to accomplish some useful function, e.g., to estimate range of the peer relative to the other, as described below.

In some demonstrative embodiments, for example, there is enough information at each of the peers, e.g., at the end of the exchange, which may allow the peer devices to select to either abort the conversation or to get setup for continuing to exchange messages in order to execute one or more protocols, e.g., as described below.

In some demonstrative embodiments, devices 102, 140, 160 and/or 180 may be configured to perform one or more of the operations and/or functionalities described herein to negotiate one or more range measurement protocols, which may be implemented, for example, in accordance with one or more Specifications and/or protocols, for example, a future IEEE 802.11 Specification, for example, by a task group dealing with WiFi positioning, e.g., IEEE 802.11az—Next Generation positioning.

In some demonstrative embodiments, devices 102, 140, 160 and/or 180 may be configured to negotiate one or more, e.g. a set of, a range measurement protocol parameters, which may enable, for example, execution, e.g., efficient execution, of one or more range measurement protocols, e.g., as described below. For example, the range measurement protocol parameters may include for example, one or more parameters of a Very High Throughput-Null Data Packet (VHT-NDP) Sounding protocol, a High-Efficiency Wireless (HEW)-NDP Sounding protocol, an FTM protocol, and/or 60 GHz range measurement protocol, e.g., as described below. In other embodiments, the range measurement protocol parameters may include any other additional parameters of any other additional or alternative range measurement protocols.

In one example, an initiator device, e.g., device 102, may be configured to allocate one or more sounding-identifiers, which may be configured to negotiate with a responder device, e.g., device 140, device 160 and/or device 180, a designation of one or more timeslots for a range measurement protocol response from the responder device, e.g., as described below.

In one example, an initiator device, e.g., device 102, may be configured to discover matching capabilities and/or negotiated protocol-specific parameters with the responder device, e.g., device 140, device 160 and/or device 180. For example, upon discovery of matching the capabilities and negotiated protocol-specific parameters, the initiator device, e.g., wireless communication device 102, may execute one or more protocol exchanges with one or more responder or responder stations, e.g., wireless communication devices 140, 160 and/or 180 to accomplish a range estimation with at least one responder device, e.g., wireless communication devices 140, 160 and/or 180.

In some demonstrative embodiments, devices 102, 140, 160 and/or 180 may be configured to negotiate the one or more range measurement protocols, for example, even at an unassociated mode of device 102, for example, when device 102 is unassociated with devices 140m 160, and/or 180, e.g., as described below.

In some demonstrative embodiments, for example, when peers devices are in an unassociated, e.g., wireless device 102 is unassociated with devices 140, 160 and/or 180, there may be a situation where there are multiple protocols from which a protocol to be executed may be selected. For example, there may be a technical problem for one or more of the peer devices to be able to prepare for execution of complex protocols, e.g., range measurement protocols, since there is not enough information known about the capabilities and states of the peer stations. For example, protocols, e.g., range measurement protocols, like the ones used, for example, for indoor navigation, may involve a wireless mobile device, e.g., the initiator station, communicating with two or more wireless fixed devices, e.g., the responder stations, within the location, for example, while the wireless mobile device and the two or more wireless fixed devices are at an unassociated mode.

In some demonstrative embodiments, devices 102, 140, 160, and/or 180 may be configured to perform one or more operations, which may be configured to support a wireless mobile device, e.g., device 120, to discover the capabilities of one or more responder devices within a location, e.g., devices 140, 160 and/or 180, and/or to support one or more of the responder devices to discover the capabilities of the wireless mobile device, e.g., as described below.

In some demonstrative embodiments, allowing device 102 to discover the capabilities of devices 140, 160 and/or 180, and/or allowing devices 140, 160 and/or 180 to discover the capabilities of device 120, may allow a technical advantage, for example, at least on allowing devices 102, 140, 160 and/or 180 to select, for example, a mode of operation of a protocol, e.g., the most effective mode, for example, in terms of being able to achieve the best accuracy in the shortest possible time, and/or in terms of any other parameter, as described below.

In some demonstrative embodiments, devices 102, 140, 160, and/or 180 may be configured to perform one or more operations, which may be configured to support, for example, mutual discovery, which in turn may provide, for example, at least a technical advantage in the form of effective execution of protocols, e.g., for indoor navigation, and/or any other protocols, e.g., as described below.

In some demonstrative embodiments, devices 102, 140, 160, and/or 180 may be configured to implement, for example, one or more range measurement protocols. In one example, the one or more range measurement protocols may include, for example, in accordance with an IEEE 802.11-2016 Specification. an FTM protocol, which may be implemented to execute and estimate the range between a mobile wireless station and an at least one responder station, e.g., a fixed wireless station. For example, although the FTM protocol may use one or more action frames to negotiate protocol execution parameters, the FTM protocol itself may support evolutions of the protocol and/or other protocols.

In some demonstrative embodiments, devices 102, 140, 160, and/or 180 may be configured to perform one or more negotiation operations and/or communications, e.g., as described below, which may allow, for example, providing a technical advantage, for example, by allowing to select a common mode of operation, for example, when devices 102, 140, 160 and/or 180 are capable of operating at several range measuring modes, e.g., FTM, VHT-sounding and/or HEW-sounding, e.g., as described below.

In some demonstrative embodiments, devices 102, 140, 160, and/or 180 may be configured to perform one or more negotiation operations and/or communications, e.g., as described below, which may allow, for example, providing a technical advantage, for example, by allowing to execute a measurement phase, for example, even when a time-sensitive part of the executed protocol may require little or no interaction with a MAC layer of devices 102, 140, 160 and/or 180, e.g., as described below.

In some demonstrative embodiments, devices 102, 140, 160, and/or 180 may be configured to perform one or more negotiation operations and/or communications, e.g., as described below, which may allow, for example, providing a technical advantage, for example, by allowing to set up parameters that may govern time-sensitive scheduling and/or sequencing of message exchanges between the, devices 102, 140, 160, and/or 180, e.g., as described below.

In some demonstrative embodiments, devices 102, 140, 160, and/or 180 may be configured to perform one or more negotiation operations and/or communications, e.g., as described below, which may allow, for example, providing a technical advantage, for example, by allowing to negotiate one or more potential protocols, e.g., other protocols, which may be, for example, time-sensitive and/or provide for estimation of either auxiliary indoor location parameters or other parameters that the wireless mobile device may utilize.

In some demonstrative embodiments, devices 102, 140, 160 and/or 180 may be configured to implement a negotiation of a range measurement protocol to perform a range measurement procedure according to a negotiated range measurement protocol, e.g., as described below.

In some demonstrative embodiments, the negotiated range measurement protocol may be selected and/or set by the responder station, e.g., device 140, for example, by selecting the negotiated range measurement protocol from one or more range measurement protocols supported by the initiator station, e.g., device 102, e.g., as described below. In other embodiments, the negotiated range measurement protocol may be selected in any other manner, e.g., by the initiator device and/or the responder device.

In some demonstrative embodiments, a first device, e.g., device 102, may be configured to, e.g., at an unassociated mode when the first device is unassociated with second device, e.g., device 140, transmit a negotiation request message to the second device and receive a negotiation response message from the second device to negotiate protocol to perform a procedure with the second device, e.g., as described below.

In some demonstrative embodiments, the second device, e.g., device 140, may be configured to, e.g., at an unassociated mode when the first device is unassociated with second device, receive the negotiation request message from the second device and transmit the negotiation response message to the first device to negotiate protocol to perform the procedure with the device, e.g., as described below.

In some demonstrative embodiments, the negotiation request message may include an first protocol element (also referred to as "initiator protocol element"), which may include, for example, an indication of one or more first protocols supported by the initiator station (also referred to as "initiator protocols"), e.g., as described below.

In some demonstrative embodiments, the second station, e.g., device 140, may be configured to transmit a negotiation response message to the unassociated first device, for example, in response to the negotiation request message, e.g., as described below.

In some demonstrative embodiments, the negotiation response message may include a compatibility indication to indicate whether or not at least one of the initiator protocols is compatible with at least one second protocol supported by the second device (also referred to as "the responder protocol), e.g., as described below.

In some demonstrative embodiments, the first device, e.g., device 102, may be configured to receive the negotiation response message including the compatibility indication to indicate whether or not at least one of the initiator protocols is compatible with at least one responder protocol supported by the second device, e.g., as described below.

In some demonstrative embodiments, the first device, e.g., device 102, may be configured to receive the negotiation response message including the compatibility indication to indicate whether or not at least one of the initiator protocols is compatible with at least one responder protocol supported by the first device, e.g., as described below.

In some demonstrative embodiments, the first device, e.g., device 102, may be configured to, for example, based on the compatibility indication, select to perform the procedure with the second device or to abort communication with the second device, e.g., as described below.

In some demonstrative embodiments, an initiator station, e.g., device 102, may be configured to, e.g., at an unassociated mode when the initiator station is unassociated with a responder station, e.g., device 140, transmit a negotiation request message to the responder station and receive a negotiation response message from the responder station to negotiate a range measurement protocol to perform a range measurement procedure with the responder station, e.g., as described below.

In some demonstrative embodiments, the negotiation request message may include an first protocol element (also referred to as "initiator protocol element"), which may include, for example, an indication of one or more first range measurement protocols supported by the initiator station (also referred to as "initiator range measurement protocols"), e.g., as described below.

In some demonstrative embodiments, the responder station, e.g., device 140, may be configured to receive the negotiation request message from the initiator station, e.g., the unassociated initiator station, to negotiate the range measurement protocol to perform a range measurement procedure, e.g., as described below. For example, the negotiation request message may include the initiator protocol element including an indication of one or more initiator range measurement protocols supported by the unassociated initiator station, e.g., as described below.

In some demonstrative embodiments, the responder station, e.g., device 140, may be configured to transmit a negotiation response message to the unassociated initiator station, for example, in response to the negotiation request message, e.g., as described below.

In some demonstrative embodiments, the negotiation response message may include a compatibility indication to indicate whether or not at least one of the initiator range measurement protocols is compatible with at least one second range measurement protocol supported by the responder station (also referred to as "the responder range measurement protocol), e.g., as described below.

In some demonstrative embodiments, the initiator station, e.g., device 102, may be configured to receive the negotiation response message including the compatibility indication to indicate whether or not at least one of the initiator range measurement protocols is compatible with at least one responder range measurement protocol supported by the responder station, e.g., as described below.

In some demonstrative embodiments, the initiator station, e.g., device 102, may be configured to, for example, based on the compatibility indication, select to perform the range measurement procedure with the responder station or to abort communication with the responder station, e.g., as described below.

In some demonstrative embodiments, the one or more initiator range measurement protocols and/or the one or more responder range measurement protocols may include at least one of a Fine Timing Measurement (FTM) protocol, a Very High Throughput-Null Data Packet (VHT-NDP) sounding protocol, a High-Efficiency Wireless (HEW)-NDP sounding protocol, and/or a 60 Gigahertz (GHz) range measurement protocol, e.g., as described below. In other embodiments, the one or more initiator range measurement protocols and/or the one or more responder range measurement protocols may include any one or more additional or alternative range measurement protocols.

In some demonstrative embodiments, the negotiation request message and/or the negotiation response message may include FTM messages. For example, the negotiation request message may include an Initial FTM Request (iFTMR) message, and/or the negotiation response message may include an FTM response message, e.g., as described below. In other embodiments, the negotiation request message and/or the negotiation response message may include any other FTM messages and/or any pother type of messages.

In some demonstrative embodiments, the compatibility indication in the negotiation response message may include a negotiation status indicator including, for example, either a negotiation success indication or a negotiation failure indication, e.g., as described below. In one example, the negotiation failure indication may indicate, for example, that none of the one or more initiator range measurement protocols is compatible with the at least one responder range measurement protocol; and/or the negotiation success indication may indicate, for example, that at least one of the initiator range measurement protocols is compatible with the at least one responder range measurement protocol, e.g., as described below. In other embodiments, any other indicator may be implemented.

In some demonstrative embodiments, the responder station, e.g., device 140, may be configured to select a selected range measurement protocol from the one or more initiator range measurement protocols, which is supported by the responder station, for example, from the one or more initiator range measurement protocols indicated by the negotiation request message, e.g., as described below.

In some demonstrative embodiments, the responder station, e.g., device 140, may be configured to generate the negotiation response message to include an indication of the selected range measurement protocol, for example, in a responder protocol element, e.g., as described below.

In some demonstrative embodiments, the initiator station, e.g., device 102, may be configured to perform the range measurement procedure with the responder station, for example, according to the selected range measurement protocol as indicated by the negotiation response message, e.g., as described below.

In some demonstrative embodiments, the initiator station, e.g., device 102, may be configured to generate the negotiation request message including a protocol parameter element (also referred to as "the initiator protocol parameter element") including one or more initiator range measurement parameter fields corresponding to the one or more initiator range measurement protocols, e.g., as described below. For example, an initiator range measurement parameter field may include one or more operating parameters corresponding to a respective initiator range measurement protocol, e.g., as described below.

In some demonstrative embodiments, the initiator station, e.g., device 102, may be configured to generate the initiator protocol parameter element including a common-parameter sub-element, which may include, for example, one or more common operating parameters to be commonly applied to a plurality of, e.g., some or all, initiator range measurement protocols, e.g., as described below. In one example, the common-parameter sub-element may include one or more common operating parameters to be commonly applied to all initiator range measurement protocols, e.g., as described below. In another example, the common-parameter sub-element may include one or more common operating parameters to be commonly applied to some of the initiator range measurement protocols, e.g., as described below.

In some demonstrative embodiments, the one or more common operating parameters may include, for example, at least one of a number of antennas of the initiator station, a measurement type parameter to indicate a type of a measurement for the range measurement procedure, e.g., a ToF, Angle of Arrival (AoA), Angle of Departure (AoD), and/or any other type of measurement; a minimum response time parameter to indicate a minimum response time for the range measurement procedure, e.g., a minimal time in Time Units (TUs); a maximum response time parameter to indicate a maximum response time for the range measurement procedure, e.g., a maximal time in TUs; and/or an immediate response parameter to indicate whether an immediate response is to be implemented for the range measurement procedure, e.g., as described below. In other embodiments, the one or more common operating parameters may include any other additional or alternative parameters.

In some demonstrative embodiments, the initiator station, e.g., device 102, may be configured to generate the negotiation request message including a preference indicator to indicate a preferred range measurement protocol of the one or more initiator range measurement protocols, e.g., as described below.

In some demonstrative embodiments, the responder station, e.g., device 140, may be configured to determine the selected range measurement protocol, for example, based at least on the preferred range measurement protocol, e.g., as described below.

In some demonstrative embodiments, the responder station, e.g., device 140, may be configured to generate the negotiation response message including a protocol parameter element (also referred to as "the responder protocol parameter element") including one or more responder range measurement parameter fields corresponding to the one or more responder range measurement protocols, e.g., as described below. For example, a responder range measurement parameter field may include one or more operating parameters corresponding to a respective responder range measurement protocol, e.g., as described below.

In some demonstrative embodiments, the responder station, e.g., device 140, may be configured to generate the responder protocol parameter element including a common-parameter sub-element, which may include, for example, one or more common operating parameters to be commonly applied to a plurality of, e.g., some or all, responder range measurement protocols, e.g., as described below. In one example, the common-parameter sub-element may include one or more common operating parameters to be commonly applied to all responder range measurement protocols, e.g., as described below. In another example, the common-parameter sub-element may include one or more common operating parameters to be commonly applied to some of the responder range measurement protocols, e.g., as described below.

In some demonstrative embodiments, the one or more common operating parameters may include, for example, at least one of a number of antennas of the responder station, a measurement type parameter to indicate a type of a measurement for the range measurement procedure, a minimum response time parameter to indicate a minimum response time for the range measurement procedure, a maximum response time parameter to indicate a maximum response time for the range measurement procedure, and/or an immediate response parameter to indicate whether an immediate response is to be implemented for the range measurement procedure, e.g., as described below. In other embodiments, the one or more common operating parameters may include any other additional or alternative parameters.

In some demonstrative embodiments, the initiator station, e.g., device 102, may be configured to negotiate one or more protocols with a plurality of responder stations, e.g., as described below.

In some demonstrative embodiments, the initiator station, e.g., device 102, may be configured to transmit a first negotiation request message to a first responder station, e.g., device 140, and receive a first negotiation response message from the first responder station to negotiate a first protocol; and transmit a second negotiation request message to a second responder station, e.g., device 160, and receive a second negotiation response message from the second responder station to negotiate a second protocol, e.g., as described below.

In some demonstrative embodiments, the initiator station, e.g., device 102, may be configured to perform range measurements with the first and second responder stations according to the first and second protocols, respectively, e.g., as described below.

In some demonstrative embodiments, an initiator station, e.g., device 102, may be configured to perform a negotiation phase, for example, even when the initiator station is unassociated with one or more responder stations, e.g., devices 140, 160 and/or 180, e.g., as described below.

In some demonstrative embodiments, the initiator station, e.g., device 102, may discover one or more ranging capabilities of the one or more responder stations, e.g., devices 140, 160 and/or 180, e.g., as described below.

In some demonstrative embodiments, the initiator station, e.g., device 102, may be configured to receive a beacon from a responder station, e.g., device 140. For example, the beacon may include one or more ranging capability parameters to indicate a capability of the responder station, e.g., device 140, to perform a range measurement procedure.

In some demonstrative embodiments, station, e.g., device 102, may be configured to for example, based on the ranging capability parameters, select to negotiate the range measurement protocol with the responder station, e.g., as described below.

In some demonstrative embodiments, the initiator station, e.g., device 102, may be configured to transmit a first negotiation request message to a first responder station, e.g., device 140, and to receive a first negotiation response message from the first responder station, e.g., device 140, to negotiate a first protocol, e.g., as described below. In one example, the first protocol may be selected, for example, from a plurality of range measurement protocols, e.g., including one or more of an FTM protocol, a VHT-NDP sounding protocol, a HEW-NDP sounding protocol, and/or a 60 GHz range measurement protocol, e.g., as described below. In other embodiments, any other additional or alternative range measurement protocols may be implemented.

In some demonstrative embodiments, initiator station, e.g., device 102, may be configured to transmit a second negotiation request message to a second responder station, e.g., device 160, and to receive a second negotiation response message from the second responder station, e.g., device 160, to negotiate a second protocol, e.g., as described below. In one example, the second protocol may be selected, for example, from a plurality of range measurement protocols, e.g., including one or more of an FTM protocol, a VHT-NDP sounding protocol, a HEW-NDP sounding protocol, and/or a 60 GHz range measurement protocol, e.g., as described below. In other embodiments, any other additional or alternative range measurement protocols may be implemented.

In some demonstrative embodiments, the initiator station, e.g., device 102, may perform range measurements with the first and/or second responder stations, e.g., devices 140 and 160, for example, according to the first and/or second protocols, respectively, e.g., as described below.

In some demonstrative embodiments, the initiator station, e.g., device 102, may be configured to, e.g., at the unassociated mode, transmit a negotiation request message 130 to the responder station, e.g., device 140, and to receive a negotiation response message 135 from the responder station, e.g., device 140, to negotiate a range measurement protocol to perform a range measurement procedure with the responder station, e.g., as described below.

In some demonstrative embodiments, the initiator station, e.g., device 102, may support, for example, one or more initiator range measurement protocols, and/or the responder station, e.g., device 140, may support one or more responder range measurement protocols, e.g., as described below.

In some demonstrative embodiments, negotiation request message 130 may include an initiator protocol element including, for example, an indication of the one or more initiator range measurement protocols supported by the initiator station, e.g., device 102, e.g., as described below.

In some demonstrative embodiments, the negotiation request message 130 may include, for example, a preference indicator to indicate a preferred range measurement protocol of the one or more initiator range measurement protocols, e.g., as described below. For example, device 102 may be configured to set the preference indicator to indicate at least one initiator range measurement protocol, which is preferred by device 102, e.g., based on any suitable criteria.

In some demonstrative embodiments, the responder station, e.g., device 140, may be configured to receive negotiation request message 130 from the unassociated initiator station, e.g., device 102, and to transmit the negotiation response message 135 to the initiator station, for example, to negotiate, the range measurement protocol to perform the range measurement procedure, e.g., as described below.

In some demonstrative embodiments, the negotiation response message 135 may include, for example, a compatibility indication to indicate whether or not at least one of the initiator range measurement protocols is compatible with the at least one responder range measurement protocol supported by the responder station, e.g., device 140, e.g., as described below.

In one example, the initiator station, e.g., device 102, may support one or more of the FTM protocol, the VHT-NDP sounding protocol, the HEW-NDP sounding protocol, and/or the 60 GHz range measurement protocol; and/or the responder station, e.g., device 140, may support at least one of the FTM protocol, the VHT-NDP sounding protocol, the HEW-NDP sounding protocol, and/or the 60 GHz range measurement protocol, e.g., as described below. In other embodiments, the initiator station, e.g., device 102, and/or responder station, e.g., device 140, may support any other additional or alternative range measurement protocols.

In some demonstrative embodiments, the initiator station, e.g., device 102, may be configured to, select, for example, based at least on the compatibility indication, to perform the range measurement procedure with the responder station, e.g., device 140, or to abort communication with the responder station, e.g., device 140, e.g., as described below.

In some demonstrative embodiments, the compatibility indication in negotiation response message 135 may include a negotiation status indicator including, for example, either a negotiation success indication or a negotiation failure indication, e.g., as described below.

In some demonstrative embodiments, the negotiation failure indication may be configured to indicate that none of the one or more initiator range measurement protocols is compatible with the at least one responder range measurement protocol, e.g., as described below.

For example, device 140 may be configured to set the negotiation failure indication, for example, when the initiator station, e.g., device 102, indicates support of the VHT-NDP sounding protocol and/or the HEW-NDP sounding protocol, while the responder station, e.g., device 140, may support the FTM protocol.

In some demonstrative embodiments, the negotiation success indication may be configured to indicate that at least one of the initiator range measurement protocols may be compatible with the at least one responder range measurement protocol, e.g., as described below. For example, device 140 may be configured to set the negotiation success indication, for example, when both the initiator station, e.g., device 102, and the responder station, e.g., device 140, support at least one same protocol, for example, the FTM protocol.

In some demonstrative embodiments, the responder station, e.g., device 140, may be configured to select, for example, a selected range measurement protocol from the one or more initiator range measurement protocols, which may be supported by the responder station, e.g., device 140, e.g., as described below.

In some demonstrative embodiments, the responder station, e.g., device 140, may be configured to include in the negotiation response message 135 a protocol element, e.g., a responder protocol element, including, for example, an indication of the selected range measurement protocol from the one or more initiator range measurement protocols, which is supported by the responder station, e.g., device 140, e.g., as described below. In other embodiments, the negotiation response message 135 may include, the protocol element, e.g., the responder protocol element, including, for example, an indication of one or more additional or alternative range measurement protocol which may be supported only by the responder station, e.g., station 140, e.g., as described below.

In some demonstrative embodiments, the responder station, e.g., device 140, nay be configured to determine the selected range measurement protocol, for example, based on the preference indicator in the negotiation request message, e.g., as described below. For example, the preferred range measurement protocol may be a protocol with a best accuracy, the fastest execution, or the like.

In some demonstrative embodiments, the initiator station, e.g., station 102, may be configured to perform the range measurement procedure with the responder station, e.g., station 140, according to the selected range measurement protocol indicated by the response message 135, e.g., as described below.

In some demonstrative embodiments, negotiation request message 135 may include, for example, a protocol parameter element, e.g., an initiator protocol parameter element. including, for example, one or more initiator range measurement parameter fields corresponding to the one or more initiator range measurement protocols. For example, an initiator range measurement parameter field may include one or more operating parameters corresponding to a respective initiator range measurement protocol, e.g., as described below. In other embodiments, the protocol parameter element may include any other additional or alternative fields to support negotiation of the range measurement procedure.

In some demonstrative embodiments, the initiator protocol parameter element may include, for example, a common-parameter sub-element including, for example, one or more common operating parameters to be commonly applied to a plurality of, e.g., some or all, initiator range measurement protocols, e.g., as described below. In one example, the common-parameter sub-element may include one or more common operating parameters to be commonly applied to all initiator range measurement protocols, e.g., as described below. In another example, the common-parameter sub-element may include one or more common operating parameters to be commonly applied to some of the initiator range measurement protocols, e.g., as described below.

In some demonstrative embodiments, the one or more common operating parameters may include, for example, at least one of a number of antennas of the initiator station, e.g., device 102, a measurement type parameter to indicate a type of a measurement for the range measurement procedure, a minimum response time parameter to indicate a minimum response time for range measurement procedure, and/or maximum response time parameter to indicate a maximum response time for the range measurement procedure, and an immediate response parameter to indicate whether an immediate response is to be implemented for the range measurement procedure, e.g., as described below. In other embodiments, the common-parameter sub-element may include any other additional or alternative parameters.

In some demonstrative embodiments, the negotiation response message 135 may include, for example, a responder protocol parameter element including, for example, one or more responder range measurement parameter fields corresponding to the at least one responder range measurement protocol, e.g., as described below. In one example, the responder protocol parameter element may include, for example a parameter sub-element for, e.g., each, a responder range measurement protocol.

In some demonstrative embodiments, a responder range measurement parameter field may include, for example, one or more operating parameters corresponding to a respective responder range measurement protocol, e.g., as described below.

In some demonstrative embodiments, negotiation request message 130 may include at least an FTM element including, for example, a plurality of FTM parameters to be negotiated for an FTM range measurement procedure, e.g., as described below.

In some demonstrative embodiments, negotiation response message 135 may include, for example, an FTM element including a plurality of FTM parameters to be applied for an FTM range measurement procedure, e.g., as described below.

In some demonstrative embodiments, the negotiation request message 130 may include, for example, an Initial FTM Request (iFTMR) message e.g., as described below.

In some demonstrative embodiments, negotiation response message 135 may include, for example, an FTM response message, e.g., as described below.

Figure 2:
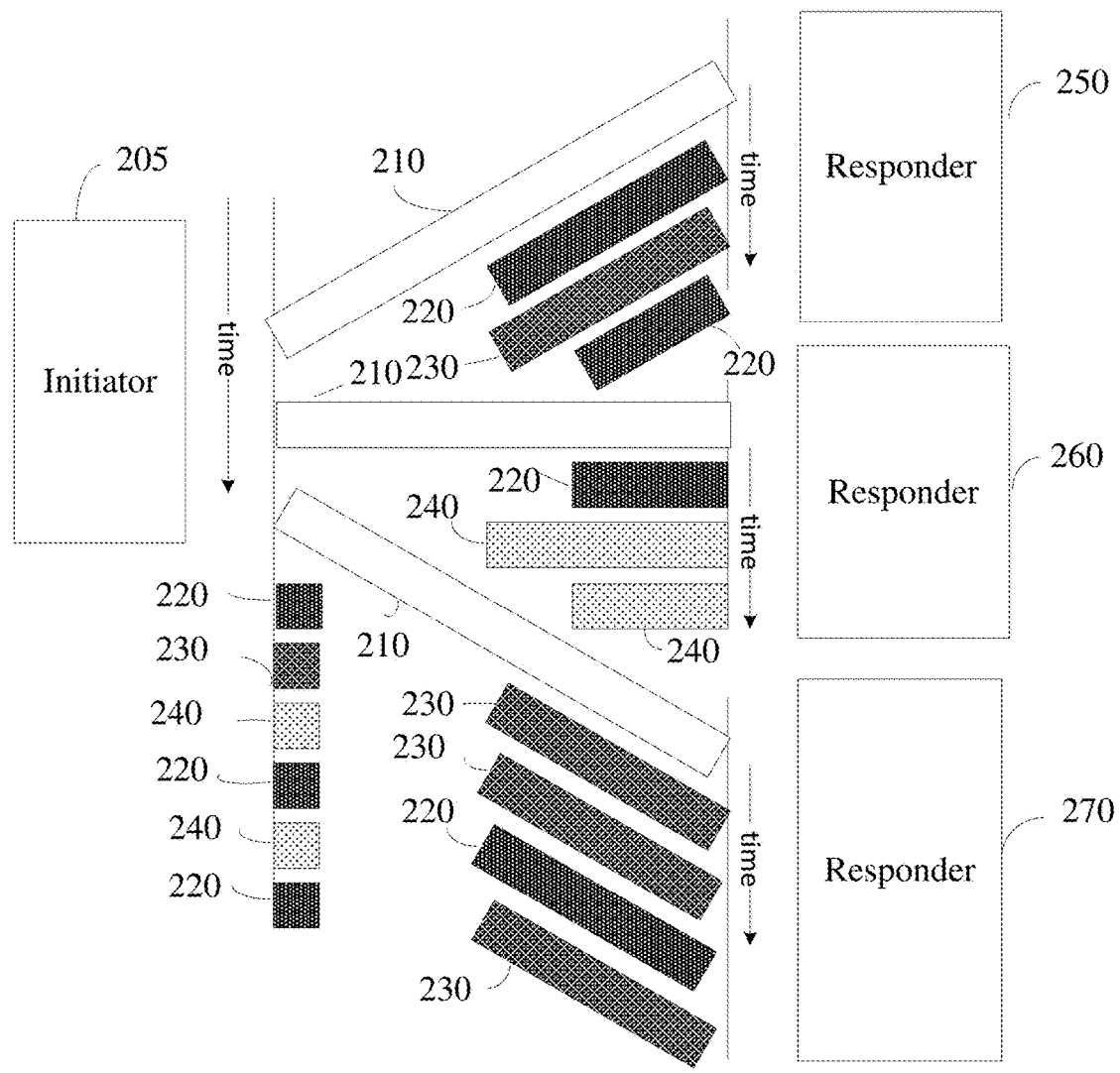
FIG. 2 is a schematic illustration of a negotiation procedure to negotiate a one or more protocols to be used between an initiator station and a plurality of responder stations, in accordance with some demonstrative embodiments.

Reference is made to FIG. 2, which schematically illustrates a negotiation procedure between an initiator station 205 and a plurality of responder stations, e.g., including responder stations 250, 260 and 270, in accordance to some demonstrative embodiments. In one example, device 102 (FIG. 1) may be configured to perform one or more operations and/or functionalities of initiator station 205, and/or devices 140 (FIG. 1) may be configured to perform one or more operations and/or functionalities of responder stations 250, 260 and/or 270.

In some demonstrative embodiments, at a negotiation phase 210 of, for example, a range measurement procedure, the initiator station 205 may transmit a negotiation request message, e.g., negotiation request message 130 (FIG. 1), to responder station 250, responder station 260 and responder station 270, e.g., as described below.

In some demonstrative embodiments, the negotiation request message may include one or more indications of one or more protocols, e.g., time sensitive protocols, supported by initiator station 205, for example, one or more initiator range measurement protocols and/or any other protocols, e.g., as described below. In one example, as shown in FIG. 2, initiator station 205 may support a protocol 220, e.g., an FTM protocol, a protocol 230, e.g., a VHT-NDP sounding protocol, and a protocol 240, e.g., a HEW-NDP sounding protocol. In other embodiments, initiator station 205 may support any other additional or alternative range measurement protocols and/or any other additional or alternative protocols.

In some demonstrative embodiments, the negotiation request message may include, for example, a choice of one or more time-sensitive protocols supported by initiator station 205, and one or more operating parameters specific to each of the indicated time-sensitive protocols, e.g., as described below.

In some demonstrative embodiments, the negotiation request message may include, for example, a protocols parameter to indicate protocols that the initiator station 205 intends to execute with the peer, if supported by the peer; capability information to indicate, for example, one or more capabilities of the initiator station 205, e.g., which may be relevant to the set of protocols indicated in the Protocols parameter; and/or setup information, for example, including information that the initiator station 205 has setup in order for a measurement phase to execute, e.g., as described below. Some of this information may be speculatively provided, for example, assuming that a responder has certain capabilities and the Measurement Phase will execute using a capability. In one example, the setup information may include information to setup one or more Group IDs, which may be required for the initiator and the responder(s) to execute the Measurement Phase using Multi-User MIMO. Any other information may be used.

In other embodiments, the negotiation request message may include some or all of the parameters listed above and/or one or more additional or alternative parameters.

In some demonstrative embodiments, as shown in FIG. 2, responder station 250 may support protocol 220, e.g., the FTM protocol, and protocol 230, e.g., the VHT-NDP sounding protocol.

In some demonstrative embodiments, as shown in FIG. 2, during negotiation phase 210, responder station 250 may transmit, for example, in response to the negotiation request message, one or more negotiation response messages, e.g., negotiation response message 135 (FIG. 1), to indicate a compatibility between the initiator protocols and the responder protocols of responder station 250, for example, to indicate that responder station 250 supports, for example, protocol 220, e.g., the FTM protocol, and protocol 230, e.g., the VHT-NDP sounding protocol.

In some demonstrative embodiments, as shown in FIG. 2, responder station 260 may support protocol 220, e.g., the FTM protocol, and protocol 240, e.g., the HEW-NDP sounding protocol.

In some demonstrative embodiments, as shown in FIG. 2, during negotiation phase 210, responder station 260 may transmit, for example, in response to the negotiation request message, one or more negotiation response messages, e.g., negotiation response message 135 (FIG. 1), to indicate a compatibility between the initiator protocols and the responder protocols of responder station 260, for example, to indicate that responder device 260 supports, for example, protocol 220, e.g., the FTM protocol, and protocol 240, e.g., the HEW-NDP sounding protocol.

In some demonstrative embodiments, as shown in FIG. 2, responder station 270 may support protocol 220, e.g., the FTM protocol, protocol 230, e.g., the VHT-NDP sounding protocol, and protocol 240, e.g., the HEW-NDP sounding protocol.

In some demonstrative embodiments, as shown in FIG. 2, during negotiation phase 210, responder station 270 may transmit, for example, in response to the negotiation request message, one or more negotiation response messages e.g., negotiation response message 135 (FIG. 1), to indicate a compatibility between the initiator protocols and the responder protocols of responder station 270, for example, to indicate that responder device 270 supports, for example, protocol 220, the FTM protocol, protocol 230, e.g., the VHT-NDP sounding protocol, and protocol 240, e.g., the HEW-NDP sounding protocol.

In some demonstrative embodiments, the negotiation response, e.g., negotiation response 135 (FIG. 1), may include, for example, a status indicating success or failure, e.g., as described above.

In some demonstrative embodiments, for example, if the status indicates success, the negotiation response may also include, for example, a protocol from the list of the time-sensitive protocols contained in the corresponding negotiation request, e.g., as described below.

In some demonstrative embodiments, for example, if the status indicates success, the negotiation response may also include, for example, one or more operating parameters specific to the chosen time-sensitive protocol. For example, one or more operating parameters may include one or more of the operating parameters specified in the negotiation request for the selected protocol; or a modified set, e.g., to fit the resource conditions of the responder.

In some demonstrative embodiments, for example, if the status indicates success, the negotiation response may also include, for example, any other resource allocation that the responder may have performed to facilitate the time-sensitive protocol execution with the peer, e.g. sounding-ids, sounding-id lifetime, and the like.

In other embodiments, the negotiation response, e.g., negotiation response 135 (FIG. 1), may include, for example, information of capabilities of the responder, information on protocols, and a status. For example, the information on the capabilities and protocols parameters may be similar to the ones in the negotiation request, e.g., except that these in the response represent the capabilities of the responding device. The status parameter may include, for example, a bit map indicating the state of the responder. For example, the responder may use this parameter to indicate that it is not capable of continuing onto the protocol execution phase and optionally include a time parameter indicating how long the responder would remain unavailable for protocol execution, or it is ready to start the Protocol Execution phase as soon as the requester is.

In other embodiments, the negotiation response message may include some or all of the parameters listed above and/or one or more additional or alternative parameters.

In some demonstrative embodiments, initiator station 205 may receive the one or more negotiation response messages from responder stations 250, 260 and/or 270.

In some demonstrative embodiments, initiator station 205 may select, for example, based on the protocols indicated by responder stations 250, 260 and/or 270, to perform with at least one of responder stations, e.g., responder stations 250, 260 and/or 270, for example, operations of a protocol, for example, a time sensitive protocol, e.g., a range measurement procedure according to a protocol supported by the responder station, or to abort the communication with the responder station.

For example, depending on the contents of the negotiation response message from a peer, initiator station 205 may have a choice of aborting the conversation with the peer, for example, if the response did not include any information that supports further conversation with the peer, or proceed to a time-sensitive protocol execution phase with the peer and execute the time-sensitive protocol with one or more corresponding operating parameters, e.g., as specified in the negotiation response from the peer.

For example, depending on the contents of the negotiation response message from responding station 250, initiator station 205 may have a choice of aborting the conversation with the responder station 250, for example, if the response did not include any information that supports further conversation with the responder station 250, or proceed to a time-sensitive protocol execution phase with the responder station 250 and execute the time-sensitive protocol with one or more corresponding operating parameters, e.g., as specified in the negotiation response from the responder station 250.

For example, depending on the contents of the negotiation response message from responding station 260, initiator station 205 may have a choice of aborting the conversation with the responder station 260, for example, if the response did not include any information that supports further conversation with the responder station 260, or proceed to a time-sensitive protocol execution phase with the responder station 260 and execute the time-sensitive protocol with one or more corresponding operating parameters, e.g., as specified in the negotiation response from the responder station 260.

For example, depending on the contents of the negotiation response message from responding station 270, initiator station 205 may have a choice of aborting the conversation with the responder station 270, for example, if the response did not include any information that supports further conversation with the responder station 270, or proceed to a time-sensitive protocol execution phase with the responder station 270 and execute the time-sensitive protocol with one or more corresponding operating parameters, e.g., as specified in the negotiation response from the responder station 270.

In one example, as shown in FIG. 2, initiator station 205 may select to perform communications with responder station 250 according to protocols 220 and 230; initiator station 205 may select to perform communications with responder station 260 according to protocols 220 and 240; and/or initiator station 205 may select to perform communications with responder station 270 according to protocols 220 and 230.

Figure 3:
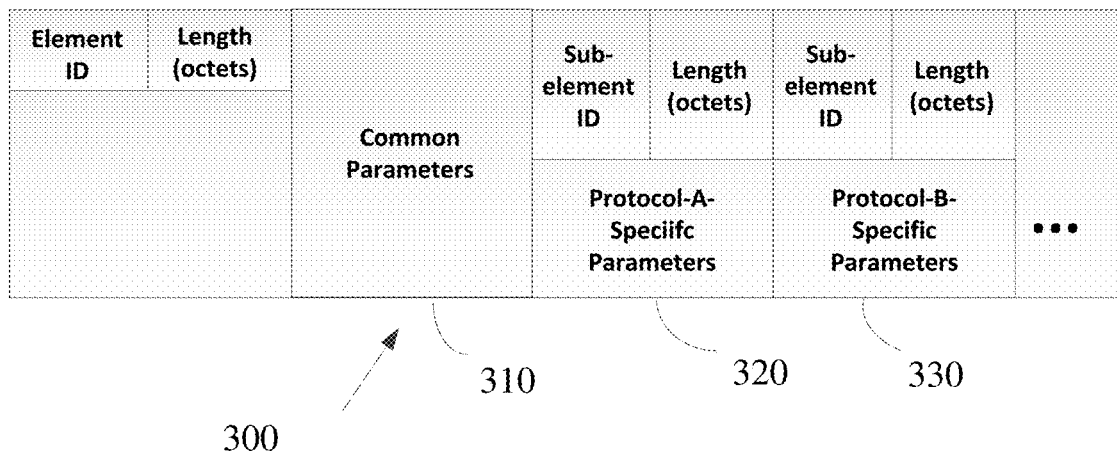
FIG. 3 is a schematic illustration of a protocol parameters element, in accordance with some demonstrative embodiments.

Reference is made to FIG. 3, which schematically illustrates a protocol parameters element 300, in accordance with some demonstrative embodiments.

In some demonstrative embodiments, the protocol parameter element 300 may be implemented, for example, as an element of a negotiation request message, e.g. negotiation request 130 (FIG. 1). In other embodiments, protocol element parameter 300 may be implemented as an element of any other additional or alternative messages.

In some demonstrative embodiments, protocol parameter element 300 may include, for example, an FTM parameters element, for example, in accordance with an IEEE 8021.11 Specification, which may include, for example, one or more parameters, which the initiator station proposes to use, for example, if an FTM protocol is to be executed between the initiator station and the responder station, e.g., as described below.

In some demonstrative embodiments, protocol parameter element 300 may include, for example, a Next Generation Positioning (NGP) parameters element, which may include, for example, one or more parameters, which the station proposes to use, for example, if a negotiated protocol, e.g., a VHT protocol or an HEW protocol, is to be executed between the initiator station and the responder station, e.g., as described below.

In some demonstrative embodiments, protocol parameter element 300 may include, for example, one or more parameter fields and/or sub-elements 320 and 330 corresponding to at least one protocol. For example, parameter fields and/or sub-elements 320 and 330 may include one or more range measurement parameter fields and/or sub-elements 320 and 330 corresponding to at least one range measurement protocol, e.g., as described below. In other embodiments, elements 320 and/or 330 may correspond to any other protocol.

For example, protocol parameter element 300 may include, for example, parameter field and/or sub-element 320, which may be corresponded to a first protocol, e.g., VHT-NDP sounding protocol, and/or parameter field and/or sub-element 330, which may corresponded to a second protocol, e.g., HEW-NDP sounding protocol, and/or additional one or more parameter fields and/or sub-elements, which may be corresponded to any additional or alternative protocols.

In some demonstrative embodiments, protocol parameter element 300 may include, for example, a common-parameter sub-element 310 including, for example, one or more common operating parameters to be commonly applied to a plurality of protocols, e.g., to some or all range measurement protocols. In one example, the common-parameter sub-element 310 may include one or more common operating parameters to be commonly applied to all range measurement protocols, e.g., as described below. In another example, the common-parameter sub-element 310 may include one or more common operating parameters to be commonly applied to some of the range measurement protocols, e.g., as described below.

For example, the one or more common operating parameters may include at least one parameter of a number of antennas of the initiator station, a measurement type parameter to indicate a type of a measurement for the range measurement procedure, a minimum response time parameter to indicate a minimum response time for the range measurement procedure, a maximum response time parameter to indicate a maximum response time for the range measurement procedure, and/or an immediate response parameter to indicate whether an immediate response is to be implemented for the range measurement procedure. The one or more common operating parameters may include any other additional or alternative parameters.

Figure 4:
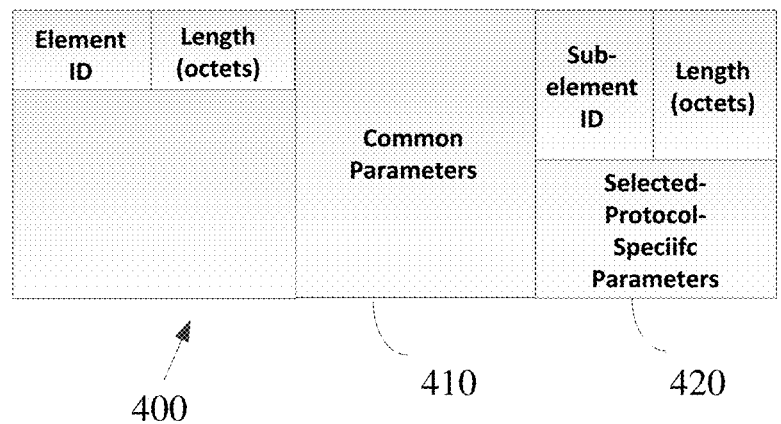
FIG. 4 is a schematic illustration of a protocol parameters element, in accordance with some demonstrative embodiments.

Reference is made to FIG. 4, which schematically illustrates a protocol parameters element 400, in accordance with some demonstrative embodiments.

In some demonstrative embodiments, the protocol parameter element 400 may be implemented, for example, as an element of a negotiation response message, e.g., negotiation response 135 (FIG. 1). In other embodiments, protocol element parameter 400 may be implemented as an element of any other additional or alternative messages.

In some demonstrative embodiments, protocol parameter element 400 may include, for example, an FTM parameters element, for example, in accordance with an IEEE 8021.11 Specification, which may include, for example, one or more parameters, which the responder station selects to use, for example, if an FTM protocol is to be executed between the initiator station and the responder station, e.g., as described below.

In some demonstrative embodiments, protocol parameter element 400 may include, for example, an NGP parameters element, which may include, for example, one or more parameters, which the station selects to use, for example, if a negotiated protocol, e.g., a VHT protocol or an HEW protocol, is to be executed between the initiator station and the responder station, e.g., as described below.

In some demonstrative embodiments, protocol parameter element 400 may include, for example, a selected protocol parameter field 420 corresponding to a selected protocol, e.g., as elected range measurement protocol, which may be selected by the responder station, e.g., device 140 (FIG. 1).

For example, the selected protocol parameter field 420 may include, for example, one or more operating parameters corresponding to the selected protocol, e.g., one or more operating parameters corresponding to the selected range measurement protocol.

In some demonstrative embodiments, protocol parameter element 400 may include, for example, a common-parameter sub-element 410 including, for example, one or more common operating parameters to be commonly applied to a plurality of protocols, e.g., to some or all range measurement protocols. In one example, the common-parameter sub-element 410 may include one or more common operating parameters to be commonly applied to all range measurement protocols, e.g., as described below. In another example, the common-parameter sub-element 410 may include one or more common operating parameters to be commonly applied to some of the range measurement protocols, e.g., as described below.

For example, the one or more common operating parameters may include at least one parameter of a number of antennas of the responder station, a measurement type parameter to indicate a type of a measurement for the range measurement procedure, a minimum response time parameter to indicate a minimum response time for the range measurement procedure, a maximum response time parameter to indicate a maximum response time for the range measurement procedure, and/or an immediate response parameter to indicate whether an immediate response is to be implemented for the range measurement procedure. The one or more common operating parameters may include any other additional or alternative parameters.

Figure 5:
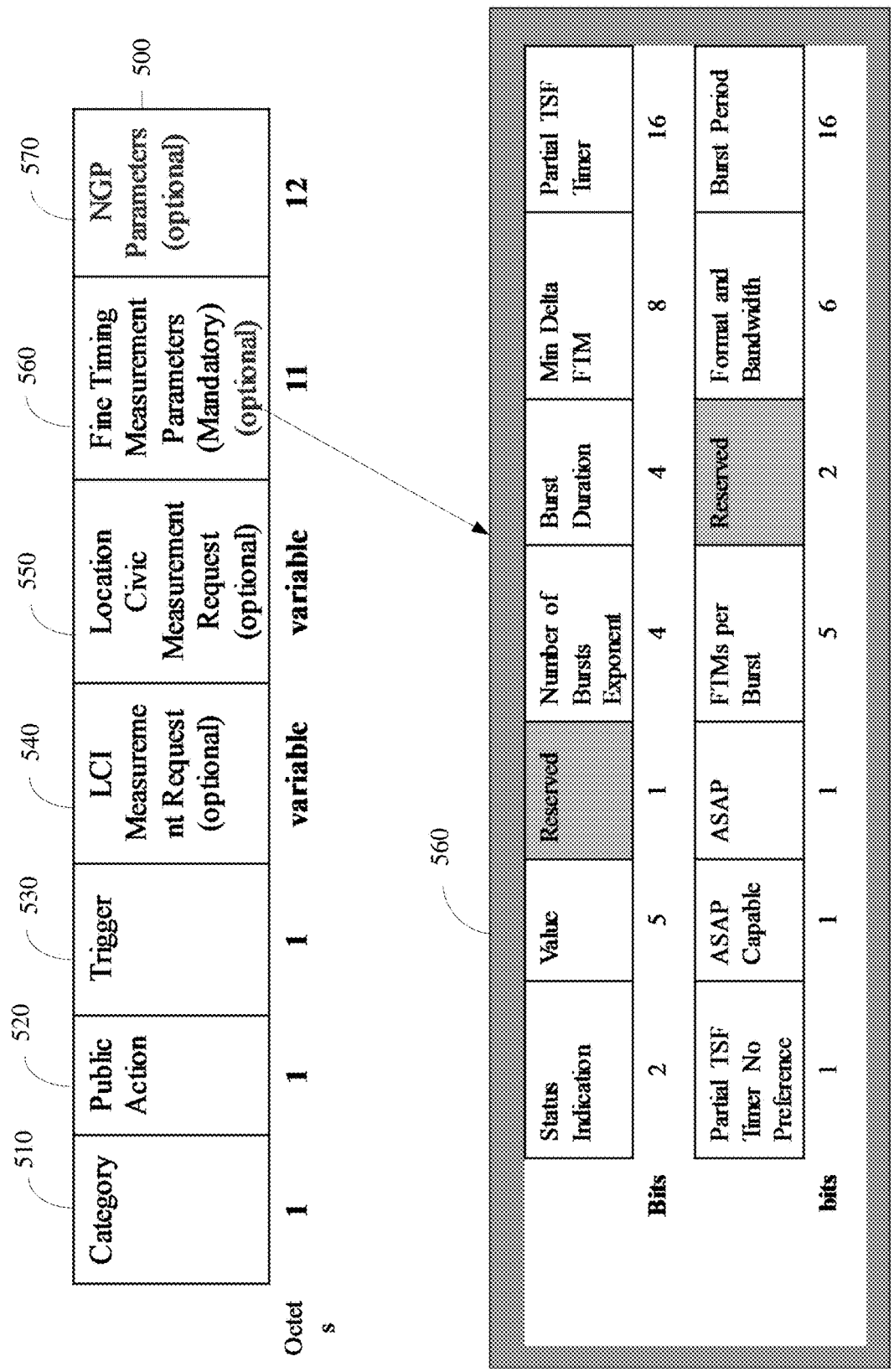
FIG. 5 is a schematic illustration of a Fine Timing Measurement (FTM) information element, in accordance with some demonstrative embodiments.

Reference is made to FIG. 5, which schematically illustrates an FTM message 500, in accordance with some demonstrative embodiments. In one example, FTM message 500 may include an initial FTM (iFTM) request and/or any other type of FTM message, which may be transmitted by an initiator, e.g., device 102, for example, as negotiation request message 130 (FIG. 1).

In some demonstrative embodiments, an initiator station, e.g., device 102, may transmit, for example, negotiation request message 130 (FIG. 1), which may include, for example, FTM message 500.

In some demonstrative embodiments, FTM message 500 may include, for example, a plurality of fields and elements, which may be configured to indicate one or more parameters, which may be implemented when performing a range measurement procedure, and/or when performing a negotiation of the range measurement protocol, e.g., as described below.

For example, the FTM message 500 may include, for example, at least one of a category field 510, a public action field 520, a trigger field 530, a location context identifier (LCI) measurement request 540, a local civic measurement request 550, an FTM measurement parameters element 560, and/or Next Generation Positioning Parameters (NGP) element 570, e.g., as described below. In other embodiments other additional or alternative fields and/or elements may be included in FTM message 500.

In some demonstrative embodiments, for example, the FTM measurement parameters element 560 may include a plurality of parameters to indicate capabilities of the initiator station, e.g., device 102 (FIG. 1), to perform the FTM procedure with one or more responder stations, e.g., devices 140, 160 and/or 180 (FIG. 1).

In some demonstrative embodiments, for example, the NGP parameters element 570 may include or more parameters to indicate capabilities of the initiator station, e.g., device 102 (FIG. 1), to perform a range measurement procedure with one or more responder stations, e.g., devices 140, 160 and/or 180 (FIG. 1), for example, based on parameters of a measurement protocol.

Figure 6:
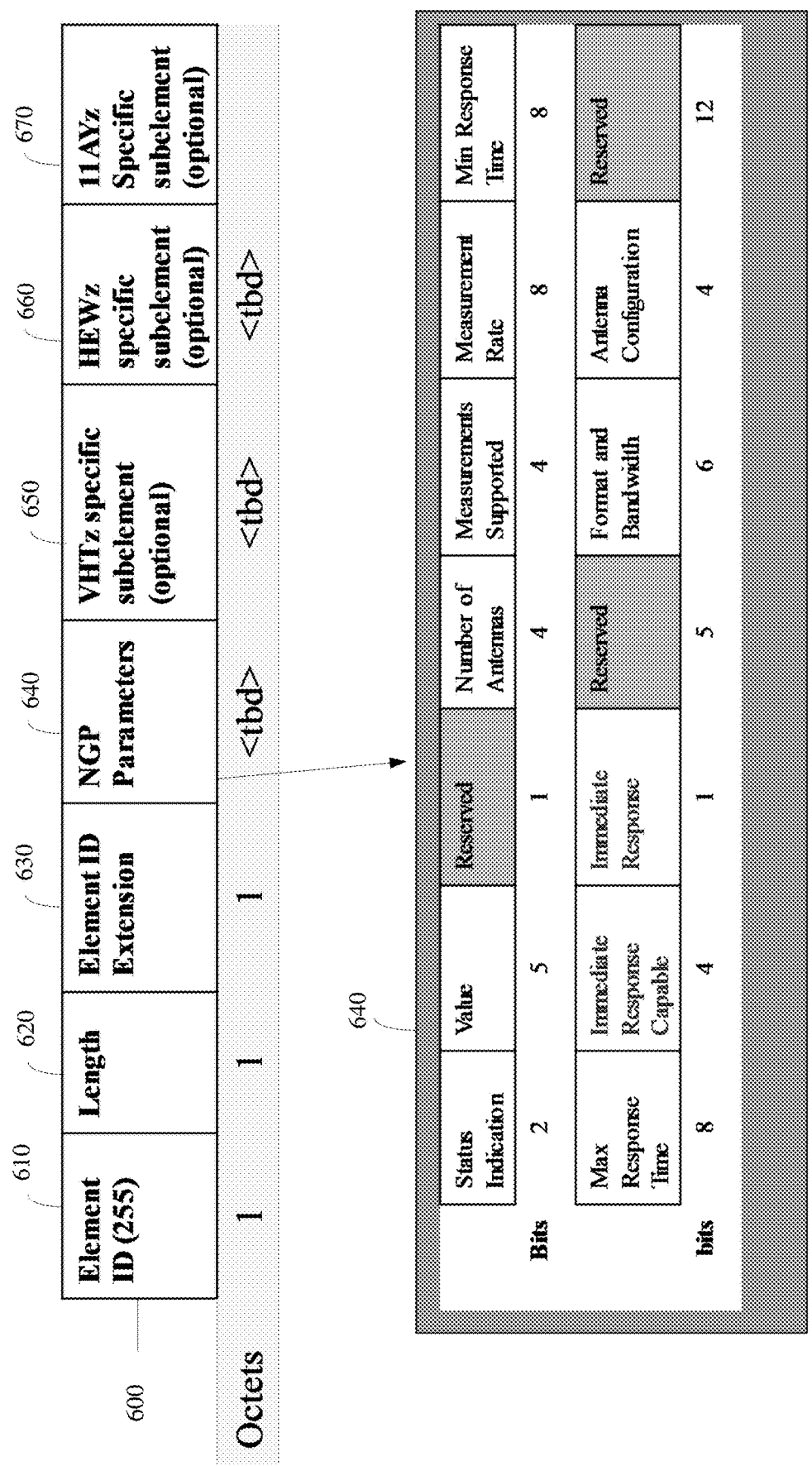
FIG. 6 is a schematic illustration of a Next Generation Positioning (NGP) information element, in accordance with some demonstrative embodiments.

Reference is made to FIG. 6, which schematically illustrates an NGP parameter element 600, in accordance with some demonstrative embodiments.

In some demonstrative embodiments, NGP parameters element 600 may be included as part of message sent by a station to indicate one or more parameters, which may be implemented when performing a range measurement procedure with the station, e.g., as described below.

In some demonstrative embodiments, NGP parameters element 600 may be included as part of a negotiation request message, e.g., negotiation request message 130 (FIG. 1), to indicate one or more parameters, which may be supported by the initiator station.

In some demonstrative embodiments, NGP parameters element 600 may be included as part of a negotiation response message, e.g., negotiation response message 135 (FIG. 1), to indicate one or more parameters, which may be supported by the responder station.

In some demonstrative embodiments, the NGP parameters element 600 may include, for example, a plurality of fields and elements, which may be configured to indicate one or more parameters, which may be implemented when performing a range measurement procedure, according to at least one range measurement protocol indicated by the NGP parameters element 600.

For example, the NGP parameters element 600 may include, for example, at least one of an element ID field 610, a length field 620, an element ID extension field 630, an NGP parameters element 640, a VHT$_Z$ specific sub-element 650, an HEW$_Z$ specific sub-element 660, and/or a 11AY$_Z$ specific sub-element 670, e.g., as described below. In other embodiments other additional or alternative fields and/or elements may be included in the NGP parameters element 600.

In some demonstrative embodiments, for example, the NGP parameters element 640 may include a plurality of parameters to indicate capabilities of a station from which a message including the NGP parameters element 600 is transmitted, e.g., the initiator station, e.g., device 102 (FIG. 1), or the responder station, e.g., device 140 (FIG. 1), to perform a range measurement procedure with one or more other stations, for example, based on parameters of a selected range measurement protocol.

In some demonstrative embodiments, the NGP parameters element 640 may include, for example, one or more common operating parameters to be commonly applied to a plurality of, e.g., some or all, range measurement protocols, e.g., as described below.

For example, the one or more common operating parameters may include at least one parameter of a number of antennas of, for example, the station; a measurement supported parameter to indicate a measurement supported, for example, by the station; a minimum response time parameter to indicate a minimum response time for range measurement procedure; a maximum response time parameter to indicate a maximum response time for the range measurement procedure; and/or an immediate response parameter to indicate whether an immediate response is to be implemented for the range measurement procedure. In other embodiments, other additional or alternative fields, elements and/or sub-elements may be implemented.

Figure 7:
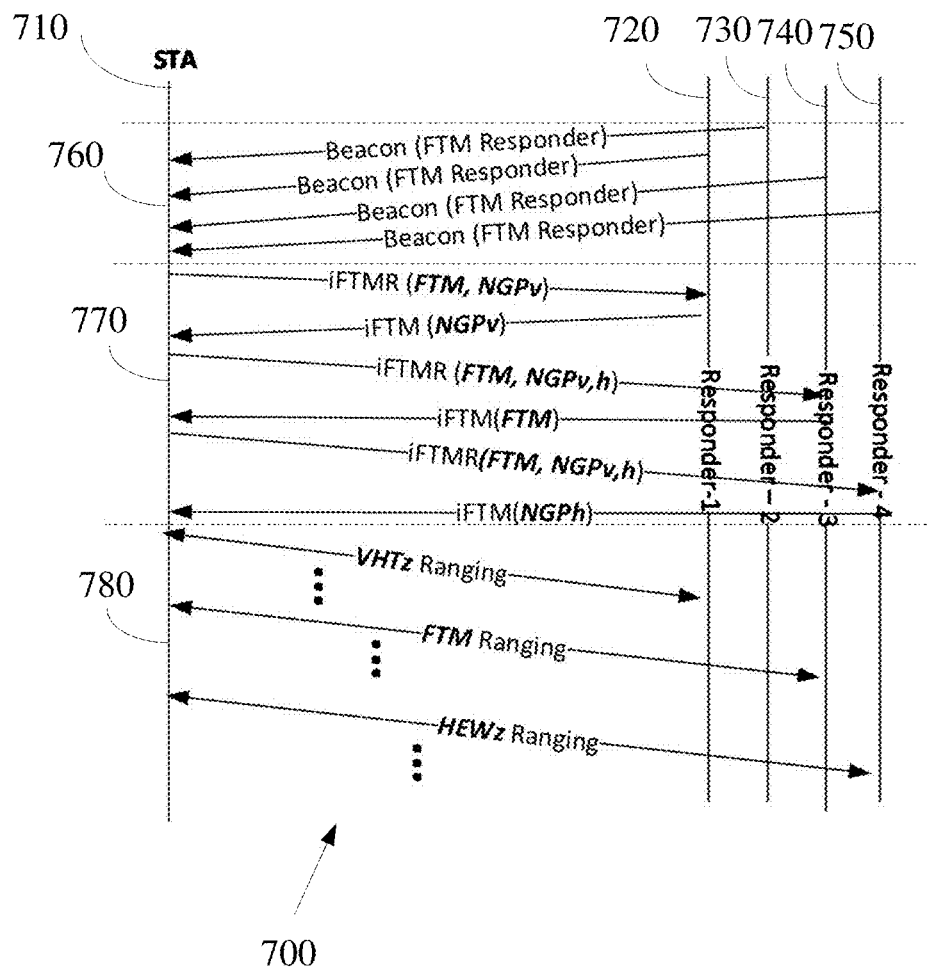
FIG. 7 is a schematic illustration of a range measurement procedure between an unassociated initiator station and a plurality of responder stations, in accordance with some demonstrative embodiments.

Reference is made to FIG. 7, which schematically illustrates a range measurement procedure 700 including communications between an unassociated initiator station 710, e.g., device 102 (FIG. 1), a plurality of responder stations 720, 730, 740 and 750, e.g., including devices 140, 160 and/or 180 (FIG. 1), in accordance with some demonstrative embodiments.

In some demonstrative embodiments, initiator station 710 may be configured to perform a range measurement procedure 700 with one or more of responder stations 720, 730, 740 and/or 750, e.g., as described below.

In some demonstrative embodiments, the range measurement procedure 700 may include, for example, a discovery phase 760, during which the initiator station 710 may discover one or more responder stations, e.g., responder stations 720, 730, 740 and/or 750, e.g., as described below.

In some demonstrative embodiments, the range measurement procedure 700 may include, for example, a negotiation phase 770, in which initiator station 710 may negotiate a range measurement protocol with responder stations 720, 730, 740 and/or 750, e.g., as described below.

In some demonstrative embodiments, the range measurement procedure 700 may include, for example, a range measurement phase 780, in which initiator station 710 may perform the range measurement procedure with one or more of, e.g., at least two or three of, the responder stations 720, 730, 740 and/or 750.

In some demonstrative embodiments, at discovery phase 760, the initiator station 710 may receive a beacon from one or more responder stations 720, 730, 740 and/or 750. For example, as shown in FIG. 7, the beacon may include an FTM responder element, which may include one or more ranging capability parameters to indicate a capability of the responder station to perform the range measurement procedure. For example, the initiator station 710 may be configured to select, for example, to negotiate the range measurement protocol with one or more selected responder stations, e.g., one or more of responder stations 720, 730, 740 and/or 750, for example, based at least on the ranging capability parameters received in the beacons from responder stations 720, 730, 740 and/or 750. For example, as shown in FIG. 7, initiator station 7190 may select responder stations 720, 740 and 750, e.g., while responder station 730 may not be selected.

In some demonstrative embodiments, at negotiation phase 770, initiator station 710 may transmit one or more negotiation request messages to the one or more selected responder stations, e.g., to responder stations 720, 740 and 750. As shown in FIG. 7, a negotiation request message of the negotiation request messages may include, for example, a protocol parameter element including an indication of one or more protocols supported by initiator station 710. For example, the negotiation request message may include an FTM parameter element and/or an NGP parameter element, e.g., as described above.

In some demonstrative embodiments, at negotiation phase 770, the selected responder stations, e.g., responder stations 720, 740 and/or 750 may transmit a negotiation response message to initiator station 710, e.g., in response to negotiation response message. As shown in FIG. 7, a negotiation response message from a responder station may include, for example, a protocol parameter element including an indication of a selected protocol, which may be supported by the responder station and may be compatible with a protocol indicated in the negotiation request from initiator station 710. For example, the negotiation response message may include an FTM parameter element and/or an NGP parameter element corresponding to the selected protocol, e.g., as described above.

In one example, the initiator station 710 may transmit, for example, to responder station 720, a negotiation request message, e.g., an IFTM request (iFTMR) message, indicating that the initiator station 710 suggests to perform a range measurement using an FTM protocol, or a VHT-NDP sounding protocol. According to his example, the initiator 710 may receive from responder station 720 a negotiation response message, e.g., an iFTM message, indicating that responder station 720 may support the VHT-NDP sounding protocol.

In one example, the initiator station 710 may transmit, for example, to responder station 740, a negotiation request message, e.g., an IFTM request (iFTMR) message, indicating that the initiator station 710 suggests to perform a range measurement using an FTM protocol, a VHT-NDP sounding protocol or an HEW-NDP sounding protocol. According to his example, the initiator 710 may receive from responder station 740 a negotiation response message, e.g., an iFTM message, indicating that responder station 740 may support the FTM protocol.

In one example, the initiator station 710 may transmit, for example, to responder station 740, a negotiation request message, e.g., an IFTM request (iFTMR) message, indicating that the initiator station 710 suggests to perform a range measurement using an FTM protocol, a VHT-NDP sounding protocol or an HEW-NDP sounding protocol. According to his example, the initiator 710 may receive from responder station 750 a negotiation response message, e.g., an iFTM message, indicating that responder station 750 may support the HEW-NDP sounding protocol.

In some demonstrative embodiments, at range measurement phase 780, the initiator station 710 may perform the range measurement procedure with one or more of, e.g., at least two of, responder stations 720, 740 and/or 750, for example, according to at least one selected range measurement protocol, for example, based on negotiation phase 770.

For example, as shown in FIG. 7, initiator station 710 may perform a range measurement procedure with responder station 720 according to the VHT-NDP sounding protocol; initiator station 710 may perform a range measurement procedure with responder station 40 according to the FTM protocol; and/or initiator station 710 may perform a range measurement procedure with responder station 750 according to the HEW-NDP sounding protocol.

Figure 8:
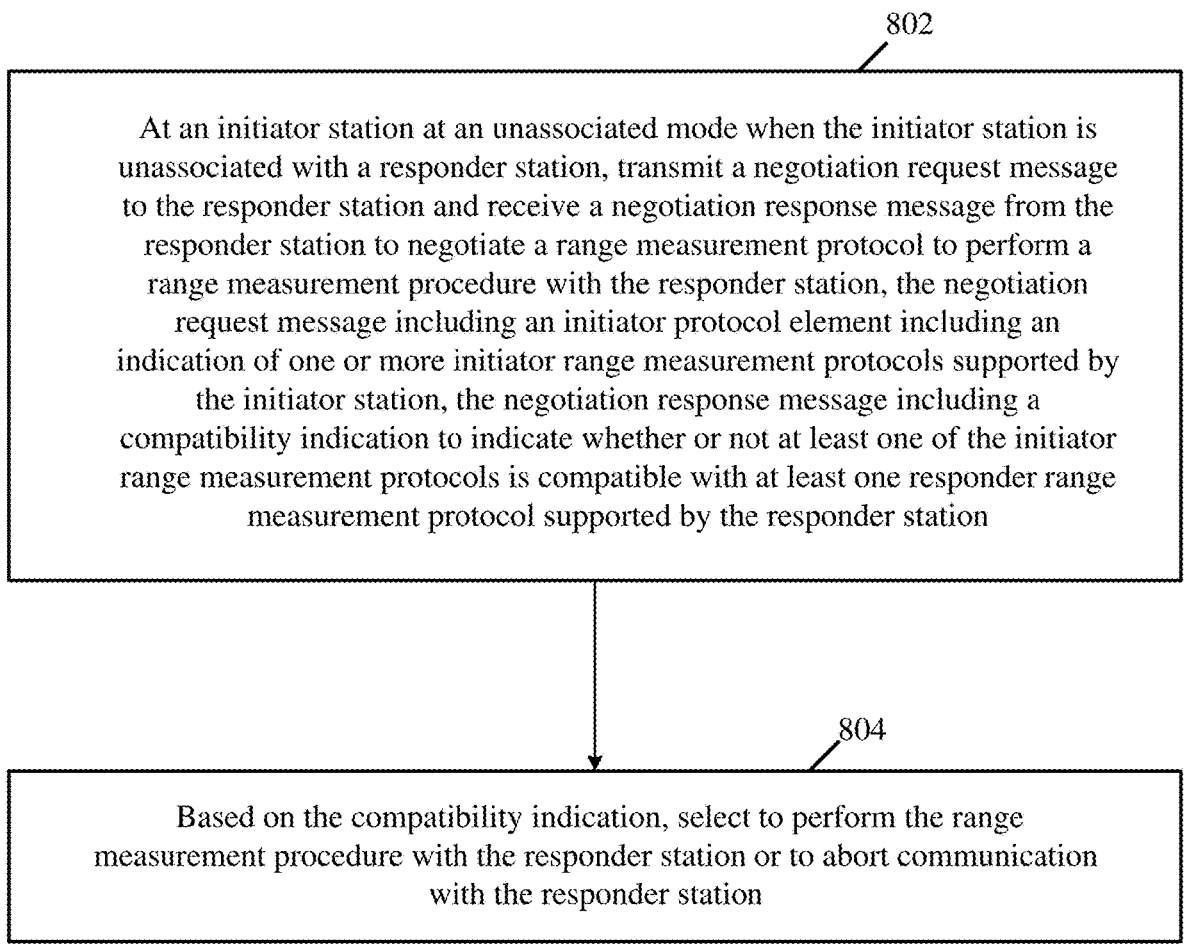
FIG. 8 is a schematic flow-chart illustration of a method of a negotiating a range measurement protocol, in accordance with some demonstrative embodiments.

Reference is made to FIG. 8, which schematically illustrates a method of negotiating a range measurement protocol, in accordance with some demonstrative embodiments. For example, one or more of the operations of the method of FIG. 8 may be performed by a wireless communication system, e.g., system 100 (FIG. 1); a wireless communication device, e.g., devices 102, 140, 160 and/or 180 (FIG. 1); a controller, e.g., controllers 124 and/or 154 (FIG. 1); a positioning component, e.g., positioning components 117 and/or 157 (FIG. 1); a radio, e.g., radios 114 and/or 144 (FIG. 1); a location estimator, e.g., location estimator 115 (FIG. 1); a message processor, e.g., message processor 128 (FIG. 1) and/or message processor 158 (FIG. 1); a transmitter, e.g., transmitters 118 and/or 148 (FIG. 1); and/or a receiver, e.g., receivers 116 and/or 146 (FIG. 1).

As indicated at block 802, the method may include at an initiator station, e.g., at unassociated mode when the initiator station is unassociated with a responder station, transmitting a negotiation request message to the responder station and receiving a negotiation response message from the responder station to negotiate a range measurement protocol to perform a range measurement procedure with the responder station. For example, the negotiation request message may include an initiator protocol element including an indication of one or more initiator range measurement protocols supported by the initiator station; and/or the negotiation response message may include a compatibility indication to indicate whether or not at least one of the initiator range measurement protocols is compatible with at least one responder range measurement protocol supported by the responder station. For example, controller 124 (FIG. 1) may control, cause and/or trigger device 102 (FIG. 1) to transmit the negotiation request message and/or receive the negotiation response message, e.g., as described above.

As indicated at block 804, the method may include selecting, for example, based on the compatibility indication, to perform the range measurement procedure with the responder station or to abort communication with the responder station. For example, controller 124 (FIG. 1) may control, cause and/or trigger device 102 (FIG. 1) to select, for example, based on the compatibility indication, to perform the range measurement procedure with the responder station or to abort communication with the responder station, e.g., as described above.

Figure 9:
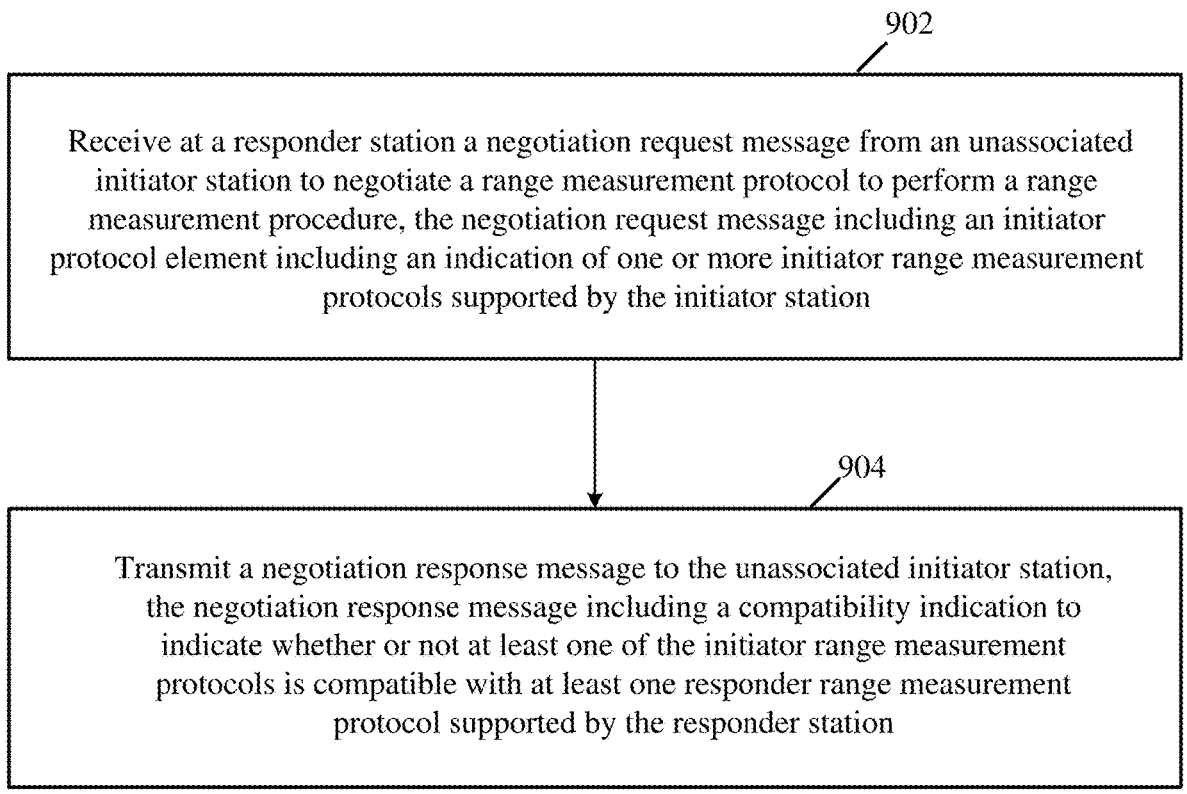
FIG. 9 is a schematic flow-chart illustration of a method of a negotiating a range measurement protocol, in accordance with some demonstrative embodiments.

Reference is made to FIG. 9, which schematically illustrates a method of negotiating a range measurement protocol, in accordance with some demonstrative embodiments. For example, one or more of the operations of the method of FIG. 9 may be performed by a wireless communication system, e.g., system 100 (FIG. 1); a wireless communication device, e.g., devices 102, 140, 160 and/or 180 (FIG. 1); a controller, e.g., controllers 124 and/or 154 (FIG. 1); a positioning component, e.g., positioning components 117 and/or 157 (FIG. 1); a radio, e.g., radios 114 and/or 144 (FIG. 1); a location estimator, e.g., location estimator 115 (FIG. 1); a message processor, e.g., message processor 128 (FIG. 1) and/or message processor 158 (FIG. 1); a transmitter, e.g., transmitters 118 and/or 148 (FIG. 1); and/or a receiver, e.g., receivers 116 and/or 146 (FIG. 1).

As indicated at block 902, the method may include at a responder station, receiving a negotiation request message from an unassociated initiator station to negotiate a range measurement protocol to perform a range measurement procedure, the negotiation request message including an initiator protocol element including an indication of one or more initiator range measurement protocols supported by the unassociated initiator station. For example, controller 144 (FIG. 1) may control, cause and/or trigger device 140 (FIG. 1) to receive the negotiation request message, e.g., as described above.

As indicated at block 904, the method may include transmitting a negotiation response message to the unassociated initiator station, the negotiation response message including a compatibility indication to indicate whether or not at least one of the initiator range measurement protocols is compatible with at least one responder range measurement protocol supported by the responder station. For example, controller 144 (FIG. 1) may control, cause and/or trigger device 144 (FIG. 1) to transmit the negotiation response message, e.g., as described above.

Figure 10:
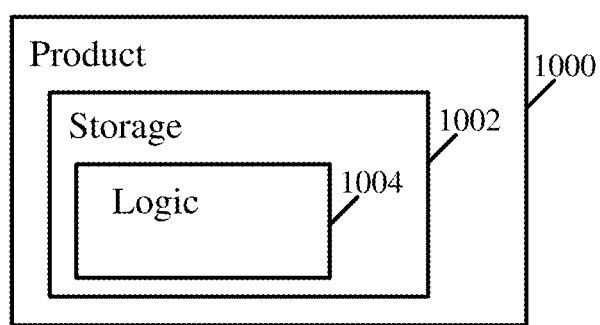
FIG. 10 is a schematic illustration of a product of manufacture, in accordance with some demonstrative embodiments.

Reference is made to FIG. 10, which schematically illustrates a product of manufacture 1000, in accordance with some demonstrative embodiments. Product 1000 may include one or more tangible computer-readable ("machine readable") non-transitory storage media 1002, which may include computer-executable instructions, e.g., implemented by logic 1004, operable to, when executed by at least one processor, e.g., computer processor, enable the at least one processor to implement one or more operations at device 102 (FIG. 1), device 140 (FIG. 1), radio 114 (FIG. 1), radio 144 (FIG. 1), transmitter 118 (FIG. 1), transmitter 148 (FIG. 1), receiver 116 (FIG. 1), receiver 146 (FIG. 1), controller 124 (FIG. 1), controller 154 (FIG. 1), message processor 128 (FIG. 1), message processor 158 (FIG. 1), positioning component 117 (FIG. 1), positioning component 157 (FIG. 1), and/or location estimator 115 (FIG. 1), to cause device 102 (FIG. 1), device 140 (FIG. 1), radio 114 (FIG. 1), radio 144 (FIG. 1), transmitter 118 (FIG. 1), transmitter 148 (FIG. 1), receiver 116 (FIG. 1), 1), receiver 146 (FIG. 1), controller 124 (FIG. 1), controller 154 (FIG. 1), message processor 128 (FIG. 1), message processor 158 (FIG. 1), positioning component 117 (FIG. 1), positioning component 157 (FIG. 1), and/or location estimator 115 (FIG. 1) to perform one or more operations, and/or to perform, trigger and/or implement one or more operations, communications and/or functionalities described above with reference to FIGS. 1, 2, 3, 4, 5, 6, 7, 8 and/or 9, and/or one or more operations described herein. The phrase "non-transitory machine-readable medium" is directed to include all computer-readable media, with the sole exception being a transitory propagating signal.

In some demonstrative embodiments, product 1000 and/or storage media 1002 may include one or more types of computer-readable storage media capable of storing data, including volatile memory, non-volatile memory, removable or non-removable memory, erasable or non-erasable memory, writeable or re-writeable memory, and the like. For example, storage media 1002 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 1004 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 1004 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising logic and circuitry configured to cause an initiator station to at an unassociated mode when the initiator station is unassociated with a responder station, transmit a negotiation request message to the responder station and receive a negotiation response message from the responder station to negotiate a range measurement protocol to perform a range measurement procedure with the responder station, the negotiation request message comprising an initiator protocol element comprising an indication of one or more initiator range measurement protocols supported by the initiator station, the negotiation response message comprising a compatibility indication to indicate whether or not at least one of the initiator range measurement protocols is compatible with at least one responder range measurement protocol supported by the responder station; and based on the compatibility indication, select to perform the range measurement procedure with the responder station or to abort communication with the responder station.

Example 2 includes the subject matter of Example 1, and optionally, wherein the compatibility indication comprises a negotiation status indicator comprising either a negotiation success indication or a negotiation failure indication, the negotiation failure indication to indicate that none of the one or more initiator range measurement protocols is compatible with the at least one responder range measurement protocol, the negotiation success indication to indicate that at least one of the initiator range measurement protocols is compatible with the at least one responder range measurement protocol.

Example 3 includes the subject matter of Example 1 or 2, and optionally, wherein the negotiation response message comprises a responder protocol element comprising an indication of a selected range measurement protocol from the one or more initiator range measurement protocols, which is supported by the responder station.

Example 4 includes the subject matter of Example 3, and optionally, wherein the apparatus is configured to cause the initiator station to perform the range measurement procedure with the responder station according to the selected range measurement protocol.

Example 5 includes the subject matter of any one of Examples 1-4, and optionally, wherein the negotiation request message comprises an initiator protocol parameter element comprising one or more initiator range measurement parameter fields corresponding to the one or more initiator range measurement protocols, an initiator range measurement parameter field comprising one or more operating parameters corresponding to a respective initiator range measurement protocol.

Example 6 includes the subject matter of Example 5, and optionally, wherein the initiator protocol parameter element comprises a common-parameter sub-element comprising one or more common operating parameters to be commonly applied to all initiator range measurement protocols.

Example 7 includes the subject matter of Example 6, and optionally, wherein the one or more common operating parameters comprise at least one parameter selected from a group consisting of a number of antennas of the initiator station, a measurement type parameter to indicate a type of a measurement for the range measurement procedure, a minimum response time parameter to indicate a minimum response time for the range measurement procedure, a maximum response time parameter to indicate a maximum response time for the range measurement procedure, and an immediate response parameter to indicate whether an immediate response is to be implemented for the range measurement procedure.

Example 8 includes the subject matter of any one of Examples 1-7, and optionally, wherein the negotiation request message comprises a preference indicator to indicate a preferred range measurement protocol of the one or more initiator range measurement protocols.

Example 9 includes the subject matter of any one of Examples 1-8, and optionally, wherein the negotiation response message comprises a responder protocol parameter element comprising one or more responder range measurement parameter fields corresponding to the at least one responder range measurement protocol.

Example 10 includes the subject matter of any one of Examples 1-9, and optionally, wherein the apparatus is configured to cause the initiator station to receive a beacon from the responder station, the beacon comprising one or more ranging capability parameters to indicate a capability of the responder station to perform the range measurement procedure; and based on the ranging capability parameters, select to negotiate the range measurement protocol with the responder station.

Example 11 includes the subject matter of any one of Examples 1-10, and optionally, wherein the apparatus is configured to cause the initiator station to transmit a first negotiation request message to a first responder station and receive a first negotiation response message from the first responder station to negotiate a first protocol; transmit a second negotiation request message to a second responder station and receive a second negotiation response message from the second responder station to negotiate a second protocol; and perform range measurements with the first and second responder stations according to the first and second protocols, respectively.

Example 12 includes the subject matter of any one of Examples 1-11, and optionally, wherein the one or more initiator range measurement protocols comprise at least one range measurement protocol selected from a group consisting of a Fine Timing Measurement (FTM) protocol, a Very High Throughput-Null Data Packet (VHT-NDP) sounding protocol, a High-Efficiency Wireless (HEW)-NDP sounding protocol, and a 60 Gigahertz (GHz) range measurement protocol.

Example 13 includes the subject matter of any one of Examples 1-12, and optionally, wherein the negotiation request message comprises a Fine Timing Measurement (FTM) element comprising a plurality of FTM parameters to be negotiated for an FTM range measurement procedure.

Example 14 includes the subject matter of any one of Examples 1-13, and optionally, wherein the negotiation response message comprises a Fine Timing Measurement (FTM) element comprising a plurality of FTM parameters to be applied for an FTM range measurement procedure.

Example 15 includes the subject matter of any one of Examples 1-14, and optionally, wherein the negotiation request message comprises an Initial Fine Timing Measurement (FTM) Request (iFTMR) message, the negotiation response message comprising an FTM response message.

Example 16 includes the subject matter of any one of Examples 1-15, and optionally, wherein the initiator station comprises a wireless mobile station.

Example 17 includes the subject matter of any one of Examples 1-16, and optionally, comprising a radio, one or more antennas, a memory, and a processor.

Example 18 includes a system of wireless communication comprising an initiator station, the initiator station comprising one or more antennas; a radio; a memory; a processor; and a controller configured to cause the initiator station to at an unassociated mode when the initiator station is unassociated with a responder station, transmit a negotiation request message to the responder station and receive a negotiation response message from the responder station to negotiate a range measurement protocol to perform a range measurement procedure with the responder station, the negotiation request message comprising an initiator protocol element comprising an indication of one or more initiator range measurement protocols supported by the initiator station, the negotiation response message comprising a compatibility indication to indicate whether or not at least one of the initiator range measurement protocols is compatible with at least one responder range measurement protocol supported by the responder station; and based on the compatibility indication, select to perform the range measurement procedure with the responder station or to abort communication with the responder station.

Example 19 includes the subject matter of Example 18, and optionally, wherein the compatibility indication comprises a negotiation status indicator comprising either a negotiation success indication or a negotiation failure indication, the negotiation failure indication to indicate that none of the one or more initiator range measurement protocols is compatible with the at least one responder range measurement protocol, the negotiation success indication to indicate that at least one of the initiator range measurement protocols is compatible with the at least one responder range measurement protocol.

Example 20 includes the subject matter of Example 18 or 19, and optionally, wherein the negotiation response message comprises a responder protocol element comprising an indication of a selected range measurement protocol from the one or more initiator range measurement protocols, which is supported by the responder station.

Example 21 includes the subject matter of Example 20, and optionally, wherein the controller is configured to cause the initiator station to perform the range measurement procedure with the responder station according to the selected range measurement protocol.

Example 22 includes the subject matter of any one of Examples 18-21, and optionally, wherein the negotiation request message comprises an initiator protocol parameter element comprising one or more initiator range measurement parameter fields corresponding to the one or more initiator range measurement protocols, an initiator range measurement parameter field comprising one or more operating parameters corresponding to a respective initiator range measurement protocol.

Example 23 includes the subject matter of Example 22, and optionally, wherein the initiator protocol parameter element comprises a common-parameter sub-element comprising one or more common operating parameters to be commonly applied to all initiator range measurement protocols.

Example 24 includes the subject matter of Example 23, and optionally, wherein the one or more common operating parameters comprise at least one parameter selected from a group consisting of a number of antennas of the initiator station, a measurement type parameter to indicate a type of a measurement for the range measurement procedure, a minimum response time parameter to indicate a minimum response time for the range measurement procedure, a maximum response time parameter to indicate a maximum response time for the range measurement procedure, and an immediate response parameter to indicate whether an immediate response is to be implemented for the range measurement procedure.

Example 25 includes the subject matter of any one of Examples 18-24, and optionally, wherein the negotiation request message comprises a preference indicator to indicate a preferred range measurement protocol of the one or more initiator range measurement protocols.

Example 26 includes the subject matter of any one of Examples 18-25, and optionally, wherein the negotiation response message comprises a responder protocol parameter element comprising one or more responder range measurement parameter fields corresponding to the at least one responder range measurement protocol.

Example 27 includes the subject matter of any one of Examples 18-26, and optionally, wherein the controller is configured to cause the initiator station to receive a beacon from the responder station, the beacon comprising one or more ranging capability parameters to indicate a capability of the responder station to perform the range measurement procedure; and based on the ranging capability parameters, select to negotiate the range measurement protocol with the responder station.

Example 28 includes the subject matter of any one of Examples 18-27, and optionally, wherein the controller is configured to cause the initiator station to transmit a first negotiation request message to a first responder station and receive a first negotiation response message from the first responder station to negotiate a first protocol; transmit a second negotiation request message to a second responder station and receive a second negotiation response message from the second responder station to negotiate a second protocol; and perform range measurements with the first and second responder stations according to the first and second protocols, respectively.

Example 29 includes the subject matter of any one of Examples 18-28, and optionally, wherein the one or more initiator range measurement protocols comprise at least one range measurement protocol selected from a group consisting of a Fine Timing Measurement (FTM) protocol, a Very High Throughput-Null Data Packet (VHT-NDP) sounding protocol, a High-Efficiency Wireless (HEW)-NDP sounding protocol, and a 60 Gigahertz (GHz) range measurement protocol.

Example 30 includes the subject matter of any one of Examples 18-29, and optionally, wherein the negotiation request message comprises a Fine Timing Measurement (FTM) element comprising a plurality of FTM parameters to be negotiated for an FTM range measurement procedure.

Example 31 includes the subject matter of any one of Examples 18-30, and optionally, wherein the negotiation response message comprises a Fine Timing Measurement (FTM) element comprising a plurality of FTM parameters to be applied for an FTM range measurement procedure.

Example 32 includes the subject matter of any one of Examples 18-31, and optionally, wherein the negotiation request message comprises an Initial Fine Timing Measurement (FTM) Request (iFTMR) message, the negotiation response message comprising an FTM response message.

Example 33 includes the subject matter of any one of Examples 18-32, and optionally, wherein the initiator station comprises a wireless mobile station.

Example 34 includes a method to be performed at an initiator station, the method comprising at an unassociated mode when the initiator station is unassociated with a responder station, transmitting a negotiation request message to the responder station and receiving a negotiation response message from the responder station to negotiate a range measurement protocol to perform a range measurement procedure with the responder station, the negotiation request message comprising an initiator protocol element comprising an indication of one or more initiator range measurement protocols supported by the initiator station, the negotiation response message comprising a compatibility indication to indicate whether or not at least one of the initiator range measurement protocols is compatible with at least one responder range measurement protocol supported by the responder station; and based on the compatibility indication, selecting to perform the range measurement procedure with the responder station or to abort communication with the responder station.

Example 35 includes the subject matter of Example 34, and optionally, wherein the compatibility indication comprises a negotiation status indicator comprising either a negotiation success indication or a negotiation failure indication, the negotiation failure indication to indicate that none of the one or more initiator range measurement protocols is compatible with the at least one responder range measurement protocol, the negotiation success indication to indicate that at least one of the initiator range measurement protocols is compatible with the at least one responder range measurement protocol.

Example 36 includes the subject matter of Example 34 or 35, and optionally, wherein the negotiation response message comprises a responder protocol element comprising an indication of a selected range measurement protocol from the one or more initiator range measurement protocols, which is supported by the responder station.

Example 37 includes the subject matter of Example 36, and optionally, comprising performing the range measurement procedure with the responder station according to the selected range measurement protocol.

Example 38 includes the subject matter of any one of Examples 34-37, and optionally, wherein the negotiation request message comprises an initiator protocol parameter element comprising one or more initiator range measurement parameter fields corresponding to the one or more initiator range measurement protocols, an initiator range measurement parameter field comprising one or more operating parameters corresponding to a respective initiator range measurement protocol.

Example 39 includes the subject matter of Example 38, and optionally, wherein the initiator protocol parameter element comprises a common-parameter sub-element comprising one or more common operating parameters to be commonly applied to all initiator range measurement protocols.

Example 40 includes the subject matter of Example 39, and optionally, wherein the one or more common operating parameters comprise at least one parameter selected from a group consisting of a number of antennas of the initiator station, a measurement type parameter to indicate a type of a measurement for the range measurement procedure, a minimum response time parameter to indicate a minimum response time for the range measurement procedure, a maximum response time parameter to indicate a maximum response time for the range measurement procedure, and an immediate response parameter to indicate whether an immediate response is to be implemented for the range measurement procedure.

Example 41 includes the subject matter of any one of Examples 34-40, and optionally, wherein the negotiation request message comprises a preference indicator to indicate a preferred range measurement protocol of the one or more initiator range measurement protocols.

Example 42 includes the subject matter of any one of Examples 34-41, and optionally, wherein the negotiation response message comprises a responder protocol parameter element comprising one or more responder range measurement parameter fields corresponding to the at least one responder range measurement protocol.

Example 43 includes the subject matter of any one of Examples 34-42, and optionally, comprising receiving a beacon from the responder station, the beacon comprising one or more ranging capability parameters to indicate a capability of the responder station to perform the range measurement procedure; and based on the ranging capability parameters, selecting to negotiate the range measurement protocol with the responder station.

Example 44 includes the subject matter of any one of Examples 34-43, and optionally, comprising transmitting a first negotiation request message to a first responder station and receiving a first negotiation response message from the first responder station to negotiate a first protocol; transmitting a second negotiation request message to a second responder station and receiving a second negotiation response message from the second responder station to negotiate a second protocol; and performing range measurements with the first and second responder stations according to the first and second protocols, respectively.

Example 45 includes the subject matter of any one of Examples 34-44, and optionally, wherein the one or more initiator range measurement protocols comprise at least one range measurement protocol selected from a group consisting of a Fine Timing Measurement (FTM) protocol, a Very High Throughput-Null Data Packet (VHT-NDP) sounding protocol, a High-Efficiency Wireless (HEW)-NDP sounding protocol, and a 60 Gigahertz (GHz) range measurement protocol.

Example 46 includes the subject matter of any one of Examples 34-45, and optionally, wherein the negotiation request message comprises a Fine Timing Measurement (FTM) element comprising a plurality of FTM parameters to be negotiated for an FTM range measurement procedure.

Example 47 includes the subject matter of any one of Examples 34-46, and optionally, wherein the negotiation response message comprises a Fine Timing Measurement (FTM) element comprising a plurality of FTM parameters to be applied for an FTM range measurement procedure.

Example 48 includes the subject matter of any one of Examples 34-47, and optionally, wherein the negotiation request message comprises an Initial Fine Timing Measurement (FTM) Request (iFTMR) message, the negotiation response message comprising an FTM response message.

Example 49 includes the subject matter of any one of Examples 34-48, and optionally, wherein the initiator station comprises a wireless mobile station.

Example 50 includes a product including one or more tangible computer-readable non-transitory storage media comprising computer-executable instructions operable to, when executed by at least one processor, enable the at least one processor to cause an initiator station to, at an unassociated mode when the initiator station is unassociated with a responder station, transmit a negotiation request message to the responder station and receive a negotiation response message from the responder station to negotiate a range measurement protocol to perform a range measurement procedure with the responder station, the negotiation request message comprising an initiator protocol element comprising an indication of one or more initiator range measurement protocols supported by the initiator station, the negotiation response message comprising a compatibility indication to indicate whether or not at least one of the initiator range measurement protocols is compatible with at least one responder range measurement protocol supported by the responder station; and based on the compatibility indication, select to perform the range measurement procedure with the responder station or to abort communication with the responder station.

Example 51 includes the subject matter of Example 50, and optionally, wherein the compatibility indication comprises a negotiation status indicator comprising either a negotiation success indication or a negotiation failure indication, the negotiation failure indication to indicate that none of the one or more initiator range measurement protocols is compatible with the at least one responder range measurement protocol, the negotiation success indication to indicate that at least one of the initiator range measurement protocols is compatible with the at least one responder range measurement protocol.

Example 52 includes the subject matter of Example 50 or 51, and optionally, wherein the negotiation response message comprises a responder protocol element comprising an indication of a selected range measurement protocol from the one or more initiator range measurement protocols, which is supported by the responder station.

Example 53 includes the subject matter of Example 52, and optionally, wherein the instructions, when executed, cause the initiator station to perform the range measurement procedure with the responder station according to the selected range measurement protocol.

Example 54 includes the subject matter of any one of Examples 50-53, and optionally, wherein the negotiation request message comprises an initiator protocol parameter element comprising one or more initiator range measurement parameter fields corresponding to the one or more initiator range measurement protocols, an initiator range measurement parameter field comprising one or more operating parameters corresponding to a respective initiator range measurement protocol.

Example 55 includes the subject matter of Example 54, and optionally, wherein the initiator protocol parameter element comprises a common-parameter sub-element comprising one or more common operating parameters to be commonly applied to all initiator range measurement protocols.

Example 56 includes the subject matter of Example 55, and optionally, wherein the one or more common operating parameters comprise at least one parameter selected from a group consisting of a number of antennas of the initiator station, a measurement type parameter to indicate a type of a measurement for the range measurement procedure, a minimum response time parameter to indicate a minimum response time for the range measurement procedure, a maximum response time parameter to indicate a maximum response time for the range measurement procedure, and an immediate response parameter to indicate whether an immediate response is to be implemented for the range measurement procedure.

Example 57 includes the subject matter of any one of Examples 50-56, and optionally, wherein the negotiation request message comprises a preference indicator to indicate a preferred range measurement protocol of the one or more initiator range measurement protocols.

Example 58 includes the subject matter of any one of Examples 50-57, and optionally, wherein the negotiation response message comprises a responder protocol parameter element comprising one or more responder range measurement parameter fields corresponding to the at least one responder range measurement protocol.

Example 59 includes the subject matter of any one of Examples 50-58, and optionally, wherein the instructions, when executed, cause the initiator station to receive a beacon from the responder station, the beacon comprising one or more ranging capability parameters to indicate a capability of the responder station to perform the range measurement procedure; and based on the ranging capability parameters, select to negotiate the range measurement protocol with the responder station.

Example 60 includes the subject matter of any one of Examples 50-59, and optionally, wherein the instructions, when executed, cause the initiator station to transmit a first negotiation request message to a first responder station and receive a first negotiation response message from the first responder station to negotiate a first protocol; transmit a second negotiation request message to a second responder station and receive a second negotiation response message from the second responder station to negotiate a second protocol; and perform range measurements with the first and second responder stations according to the first and second protocols, respectively.

Example 61 includes the subject matter of any one of Examples 50-60, and optionally, wherein the one or more initiator range measurement protocols comprise at least one range measurement protocol selected from a group consisting of a Fine Timing Measurement (FTM) protocol, a Very High Throughput-Null Data Packet (VHT-NDP) sounding protocol, a High-Efficiency Wireless (HEW)-NDP sounding protocol, and a 60 Gigahertz (GHz) range measurement protocol.

Example 62 includes the subject matter of any one of Examples 50-61, and optionally, wherein the negotiation request message comprises a Fine Timing Measurement (FTM) element comprising a plurality of FTM parameters to be negotiated for an FTM range measurement procedure.

Example 63 includes the subject matter of any one of Examples 50-62, and optionally, wherein the negotiation response message comprises a Fine Timing Measurement (FTM) element comprising a plurality of FTM parameters to be applied for an FTM range measurement procedure.

Example 64 includes the subject matter of any one of Examples 50-63, and optionally, wherein the negotiation request message comprises an Initial Fine Timing Measurement (FTM) Request (iFTMR) message, the negotiation response message comprising an FTM response message.

Example 65 includes the subject matter of any one of Examples 50-64, and optionally, wherein the initiator station comprises a wireless mobile station.

Example 66 includes an apparatus of wireless communication by an initiator station, the apparatus comprising means for, at an unassociated mode when the initiator station is unassociated with a responder station, transmitting a negotiation request message to the responder station and receiving a negotiation response message from the responder station to negotiate a range measurement protocol to perform a range measurement procedure with the responder station, the negotiation request message comprising an initiator protocol element comprising an indication of one or more initiator range measurement protocols supported by the initiator station, the negotiation response message comprising a compatibility indication to indicate whether or not at least one of the initiator range measurement protocols is compatible with at least one responder range measurement protocol supported by the responder station; and means for, based on the compatibility indication, selecting to perform the range measurement procedure with the responder station or to abort communication with the responder station.

Example 67 includes the subject matter of Example 66, and optionally, wherein the compatibility indication comprises a negotiation status indicator comprising either a negotiation success indication or a negotiation failure indication, the negotiation failure indication to indicate that none of the one or more initiator range measurement protocols is compatible with the at least one responder range measurement protocol, the negotiation success indication to indicate that at least one of the initiator range measurement protocols is compatible with the at least one responder range measurement protocol.

Example 68 includes the subject matter of Example 66 or 67, and optionally, wherein the negotiation response message comprises a responder protocol element comprising an indication of a selected range measurement protocol from the one or more initiator range measurement protocols, which is supported by the responder station.

Example 69 includes the subject matter of Example 68, and optionally, comprising means for performing the range measurement procedure with the responder station according to the selected range measurement protocol.

Example 70 includes the subject matter of any one of Examples 66-69, and optionally, wherein the negotiation request message comprises an initiator protocol parameter element comprising one or more initiator range measurement parameter fields corresponding to the one or more initiator range measurement protocols, an initiator range measurement parameter field comprising one or more operating parameters corresponding to a respective initiator range measurement protocol.

Example 71 includes the subject matter of Example 70, and optionally, wherein the initiator protocol parameter element comprises a common-parameter sub-element comprising one or more common operating parameters to be commonly applied to all initiator range measurement protocols.

Example 72 includes the subject matter of Example 71, and optionally, wherein the one or more common operating parameters comprise at least one parameter selected from a group consisting of a number of antennas of the initiator station, a measurement type parameter to indicate a type of a measurement for the range measurement procedure, a minimum response time parameter to indicate a minimum response time for the range measurement procedure, a maximum response time parameter to indicate a maximum response time for the range measurement procedure, and an immediate response parameter to indicate whether an immediate response is to be implemented for the range measurement procedure.

Example 73 includes the subject matter of any one of Examples 66-72, and optionally, wherein the negotiation request message comprises a preference indicator to indicate a preferred range measurement protocol of the one or more initiator range measurement protocols.

Example 74 includes the subject matter of any one of Examples 66-73, and optionally, wherein the negotiation response message comprises a responder protocol parameter element comprising one or more responder range measurement parameter fields corresponding to the at least one responder range measurement protocol.

Example 75 includes the subject matter of any one of Examples 66-74, and optionally, comprising means for receiving a beacon from the responder station, the beacon comprising one or more ranging capability parameters to indicate a capability of the responder station to perform the range measurement procedure; and based on the ranging capability parameters, selecting to negotiate the range measurement protocol with the responder station.

Example 76 includes the subject matter of any one of Examples 66-75, and optionally, comprising means for transmitting a first negotiation request message to a first responder station and receiving a first negotiation response message from the first responder station to negotiate a first protocol; transmitting a second negotiation request message to a second responder station and receiving a second negotiation response message from the second responder station to negotiate a second protocol; and performing range measurements with the first and second responder stations according to the first and second protocols, respectively.

Example 77 includes the subject matter of any one of Examples 66-76, and optionally, wherein the one or more initiator range measurement protocols comprise at least one range measurement protocol selected from a group consisting of a Fine Timing Measurement (FTM) protocol, a Very High Throughput-Null Data Packet (VHT-NDP) sounding protocol, a High-Efficiency Wireless (HEW)-NDP sounding protocol, and a 60 Gigahertz (GHz) range measurement protocol.

Example 78 includes the subject matter of any one of Examples 66-77, and optionally, wherein the negotiation request message comprises a Fine Timing Measurement (FTM) element comprising a plurality of FTM parameters to be negotiated for an FTM range measurement procedure.

Example 79 includes the subject matter of any one of Examples 66-78, and optionally, wherein the negotiation response message comprises a Fine Timing Measurement (FTM) element comprising a plurality of FTM parameters to be applied for an FTM range measurement procedure.

Example 80 includes the subject matter of any one of Examples 66-79, and optionally, wherein the negotiation request message comprises an Initial Fine Timing Measurement (FTM) Request (iFTMR) message, the negotiation response message comprising an FTM response message.

Example 81 includes the subject matter of any one of Examples 66-80, and optionally, wherein the initiator station comprises a wireless mobile station.

Example 82 includes an apparatus comprising logic and circuitry configured to cause a responder station to receive a negotiation request message from an unassociated initiator station to negotiate a range measurement protocol to perform a range measurement procedure, the negotiation request message comprising an initiator protocol element comprising an indication of one or more initiator range measurement protocols supported by the unassociated initiator station; and transmit a negotiation response message to the unassociated initiator station, the negotiation response message comprising a compatibility indication to indicate whether or not at least one of the initiator range measurement protocols is compatible with at least one responder range measurement protocol supported by the responder station.

Example 83 includes the subject matter of Example 82, and optionally, wherein the compatibility indication comprises a negotiation status indicator comprising either a negotiation success indication or a negotiation failure indication, the negotiation failure indication to indicate that none of the one or more initiator range measurement protocols is compatible with the at least one responder range measurement protocol, the negotiation success indication to indicate that at least one of the initiator range measurement protocols is compatible with the at least one responder range measurement protocol.

Example 84 includes the subject matter of Example 82 or 83, and optionally, wherein the apparatus is configured to cause the responder station to select a selected range measurement protocol from the one or more initiator range measurement protocols, which is supported by the responder station, the negotiation response message comprises a responder protocol element comprising an indication of the selected range measurement protocol.

Example 85 includes the subject matter of Example 84, and optionally, wherein the apparatus is configured to cause the responder station to determine the selected range measurement protocol based on a preference indicator in the negotiation request message to indicate a preferred range measurement protocol of the one or more initiator range measurement protocols.

Example 86 includes the subject matter of any one of Examples 82-85, and optionally, wherein the negotiation response message comprises a responder protocol parameter element comprising one or more responder range measurement parameter fields corresponding to one or more responder range measurement protocols, a responder range measurement parameter field comprising one or more operating parameters corresponding to a respective responder range measurement protocol.

Example 87 includes the subject matter of Example 86, and optionally, wherein the responder protocol parameter element comprises a common-parameter sub-element comprising one or more common operating parameters to be commonly applied to all responder range measurement protocols.

Example 88 includes the subject matter of Example 87, and optionally, wherein the one or more common operating parameters comprise at least one parameter selected from a group consisting of a number of antennas of the responder station, a measurement type parameter to indicate a type of a measurement for the range measurement procedure, a minimum response time parameter to indicate a minimum response time for the range measurement procedure, a maximum response time parameter to indicate a maximum response time for the range measurement procedure, and an immediate response parameter to indicate whether an immediate response is to be implemented for the range measurement procedure.

Example 89 includes the subject matter of any one of Examples 82-88, and optionally, wherein the one or more initiator range measurement protocols comprise at least one range measurement protocol selected from a group consisting of a Fine Timing Measurement (FTM) protocol, a Very High Throughput-Null Data Packet (VHT-NDP) sounding protocol, a High-Efficiency Wireless (HEW)-NDP sounding protocol, and a 60 Gigahertz (GHz) range measurement protocol.

Example 90 includes the subject matter of any one of Examples 82-89, and optionally, wherein the negotiation request message comprises a Fine Timing Measurement (FTM) element comprising a plurality of FTM parameters to be negotiated for an FTM range measurement procedure.

Example 91 includes the subject matter of any one of Examples 82-90, and optionally, wherein the negotiation response message comprises a Fine Timing Measurement (FTM) element comprising a plurality of FTM parameters to be applied for an FTM range measurement procedure.

Example 92 includes the subject matter of any one of Examples 82-91, and optionally, wherein the negotiation request message comprises an Initial Fine Timing Measurement (FTM) Request (iFTMR) message, the negotiation response message comprising an FTM response message.

Example 93 includes the subject matter of any one of Examples 82-92, and optionally, comprising a radio, one or more antennas, a memory, and a processor.

Example 94 includes a system of wireless communication comprising a responder station, the responder station comprising one or more antennas; a radio; a memory; a processor; and a controller configured to cause the responder station to receive a negotiation request message from an unassociated initiator station to negotiate a range measurement protocol to perform a range measurement procedure, the negotiation request message comprising an initiator protocol element comprising an indication of one or more initiator range measurement protocols supported by the unassociated initiator station; and transmit a negotiation response message to the unassociated initiator station, the negotiation response message comprising a compatibility indication to indicate whether or not at least one of the initiator range measurement protocols is compatible with at least one responder range measurement protocol supported by the responder station.

Example 95 includes the subject matter of Example 94, and optionally, wherein the compatibility indication comprises a negotiation status indicator comprising either a negotiation success indication or a negotiation failure indication, the negotiation failure indication to indicate that none of the one or more initiator range measurement protocols is compatible with the at least one responder range measurement protocol, the negotiation success indication to indicate that at least one of the initiator range measurement protocols is compatible with the at least one responder range measurement protocol.

Example 96 includes the subject matter of Example 94 or 95, and optionally, wherein the controller is configured to cause the responder station to select a selected range measurement protocol from the one or more initiator range measurement protocols, which is supported by the responder station, the negotiation response message comprises a responder protocol element comprising an indication of the selected range measurement protocol.

Example 97 includes the subject matter of Example 96, and optionally, wherein the controller is configured to cause the responder station to determine the selected range measurement protocol based on a preference indicator in the negotiation request message to indicate a preferred range measurement protocol of the one or more initiator range measurement protocols.

Example 98 includes the subject matter of any one of Examples 94-97, and optionally, wherein the negotiation response message comprises a responder protocol parameter element comprising one or more responder range measurement parameter fields corresponding to one or more responder range measurement protocols, a responder range measurement parameter field comprising one or more operating parameters corresponding to a respective responder range measurement protocol.

Example 99 includes the subject matter of Example 98, and optionally, wherein the responder protocol parameter element comprises a common-parameter sub-element comprising one or more common operating parameters to be commonly applied to all responder range measurement protocols.

Example 100 includes the subject matter of Example 99, and optionally, wherein the one or more common operating parameters comprise at least one parameter selected from a group consisting of a number of antennas of the responder station, a measurement type parameter to indicate a type of a measurement for the range measurement procedure, a minimum response time parameter to indicate a minimum response time for the range measurement procedure, a maximum response time parameter to indicate a maximum response time for the range measurement procedure, and an immediate response parameter to indicate whether an immediate response is to be implemented for the range measurement procedure.

Example 101 includes the subject matter of any one of Examples 94-100, and optionally, wherein the one or more initiator range measurement protocols comprise at least one range measurement protocol selected from a group consisting of a Fine Timing Measurement (FTM) protocol, a Very High Throughput-Null Data Packet (VHT-NDP) sounding protocol, a High-Efficiency Wireless (HEW)-NDP sounding protocol, and a 60 Gigahertz (GHz) range measurement protocol.

Example 102 includes the subject matter of any one of Examples 94-101, and optionally, wherein the negotiation request message comprises a Fine Timing Measurement (FTM) element comprising a plurality of FTM parameters to be negotiated for an FTM range measurement procedure.

Example 103 includes the subject matter of any one of Examples 94-102, and optionally, wherein the negotiation response message comprises a Fine Timing Measurement (FTM) element comprising a plurality of FTM parameters to be applied for an FTM range measurement procedure.

Example 104 includes the subject matter of any one of Examples 94-103, and optionally, wherein the negotiation request message comprises an Initial Fine Timing Measurement (FTM) Request (iFTMR) message, the negotiation response message comprising an FTM response message.

Example 105 includes a method to be performed at a responder station, the method comprising receiving a negotiation request message from an unassociated initiator station to negotiate a range measurement protocol to perform a range measurement procedure, the negotiation request message comprising an initiator protocol element comprising an indication of one or more initiator range measurement protocols supported by the unassociated initiator station; and transmitting a negotiation response message to the unassociated initiator station, the negotiation response message comprising a compatibility indication to indicate whether or not at least one of the initiator range measurement protocols is compatible with at least one responder range measurement protocol supported by the responder station.

Example 106 includes the subject matter of Example 105, and optionally, wherein the compatibility indication comprises a negotiation status indicator comprising either a negotiation success indication or a negotiation failure indication, the negotiation failure indication to indicate that none of the one or more initiator range measurement protocols is compatible with the at least one responder range measurement protocol, the negotiation success indication to indicate that at least one of the initiator range measurement protocols is compatible with the at least one responder range measurement protocol.

Example 107 includes the subject matter of Example 105 or 106, and optionally, comprising selecting a selected range measurement protocol from the one or more initiator range measurement protocols, which is supported by the responder station, the negotiation response message comprises a responder protocol element comprising an indication of the selected range measurement protocol.

Example 108 includes the subject matter of Example 107, and optionally, comprising determining the selected range measurement protocol based on a preference indicator in the negotiation request message to indicate a preferred range measurement protocol of the one or more initiator range measurement protocols.

Example 109 includes the subject matter of any one of Examples 105-108, and optionally, wherein the negotiation response message comprises a responder protocol parameter element comprising one or more responder range measurement parameter fields corresponding to one or more responder range measurement protocols, a responder range measurement parameter field comprising one or more operating parameters corresponding to a respective responder range measurement protocol.

Example 110 includes the subject matter of Example 109, and optionally, wherein the responder protocol parameter element comprises a common-parameter sub-element comprising one or more common operating parameters to be commonly applied to all responder range measurement protocols.

Example 111 includes the subject matter of Example 110, and optionally, wherein the one or more common operating parameters comprise at least one parameter selected from a group consisting of a number of antennas of the responder station, a measurement type parameter to indicate a type of a measurement for the range measurement procedure, a minimum response time parameter to indicate a minimum response time for the range measurement procedure, a maximum response time parameter to indicate a maximum response time for the range measurement procedure, and an immediate response parameter to indicate whether an immediate response is to be implemented for the range measurement procedure.

Example 112 includes the subject matter of any one of Examples 105-111, and optionally, wherein the one or more initiator range measurement protocols comprise at least one range measurement protocol selected from a group consisting of a Fine Timing Measurement (FTM) protocol, a Very High Throughput-Null Data Packet (VHT-NDP) sounding protocol, a High-Efficiency Wireless (HEW)-NDP sounding protocol, and a 60 Gigahertz (GHz) range measurement protocol.

Example 113 includes the subject matter of any one of Examples 105-112, and optionally, wherein the negotiation request message comprises a Fine Timing Measurement (FTM) element comprising a plurality of FTM parameters to be negotiated for an FTM range measurement procedure.

Example 114 includes the subject matter of any one of Examples 105-113, and optionally, wherein the negotiation response message comprises a Fine Timing Measurement (FTM) element comprising a plurality of FTM parameters to be applied for an FTM range measurement procedure.

Example 115 includes the subject matter of any one of Examples 105-114, and optionally, wherein the negotiation request message comprises an Initial Fine Timing Measurement (FTM) Request (iFTMR) message, the negotiation response message comprising an FTM response message.

Example 116 includes a product including one or more tangible computer-readable non-transitory storage media comprising computer-executable instructions operable to, when executed by at least one processor, enable the at least one processor to cause a responder station to receive a negotiation request message from an unassociated initiator station to negotiate a range measurement protocol to perform a range measurement procedure, the negotiation request message comprising an initiator protocol element comprising an indication of one or more initiator range measurement protocols supported by the unassociated initiator station; and transmit a negotiation response message to the unassociated initiator station, the negotiation response message comprising a compatibility indication to indicate whether or not at least one of the initiator range measurement protocols is compatible with at least one responder range measurement protocol supported by the responder station.

Example 117 includes the subject matter of Example 116, and optionally, wherein the compatibility indication comprises a negotiation status indicator comprising either a negotiation success indication or a negotiation failure indication, the negotiation failure indication to indicate that none of the one or more initiator range measurement protocols is compatible with the at least one responder range measurement protocol, the negotiation success indication to indicate that at least one of the initiator range measurement protocols is compatible with the at least one responder range measurement protocol.

Example 118 includes the subject matter of Example 116 or 117, and optionally, wherein the instructions, when executed, cause the responder station to select a selected range measurement protocol from the one or more initiator range measurement protocols, which is supported by the responder station, the negotiation response message comprises a responder protocol element comprising an indication of the selected range measurement protocol.

Example 119 includes the subject matter of Example 118, and optionally, wherein the instructions, when executed, cause the responder station to determine the selected range measurement protocol based on a preference indicator in the negotiation request message to indicate a preferred range measurement protocol of the one or more initiator range measurement protocols.

Example 120 includes the subject matter of any one of Examples 116-119, and optionally, wherein the negotiation response message comprises a responder protocol parameter element comprising one or more responder range measurement parameter fields corresponding to one or more responder range measurement protocols, a responder range measurement parameter field comprising one or more operating parameters corresponding to a respective responder range measurement protocol.

Example 121 includes the subject matter of Example 120, and optionally, wherein the responder protocol parameter element comprises a common-parameter sub-element comprising one or more common operating parameters to be commonly applied to all responder range measurement protocols.

Example 122 includes the subject matter of Example 121, and optionally, wherein the one or more common operating parameters comprise at least one parameter selected from a group consisting of a number of antennas of the responder station, a measurement type parameter to indicate a type of a measurement for the range measurement procedure, a minimum response time parameter to indicate a minimum response time for the range measurement procedure, a maximum response time parameter to indicate a maximum response time for the range measurement procedure, and an immediate response parameter to indicate whether an immediate response is to be implemented for the range measurement procedure.

Example 123 includes the subject matter of any one of Examples 116-122, and optionally, wherein the one or more initiator range measurement protocols comprise at least one range measurement protocol selected from a group consisting of a Fine Timing Measurement (FTM) protocol, a Very High Throughput-Null Data Packet (VHT-NDP) sounding protocol, a High-Efficiency Wireless (HEW)-NDP sounding protocol, and a 60 Gigahertz (GHz) range measurement protocol.

Example 124 includes the subject matter of any one of Examples 116-123, and optionally, wherein the negotiation request message comprises a Fine Timing Measurement (FTM) element comprising a plurality of FTM parameters to be negotiated for an FTM range measurement procedure.

Example 125 includes the subject matter of any one of Examples 116-124, and optionally, wherein the negotiation response message comprises a Fine Timing Measurement (FTM) element comprising a plurality of FTM parameters to be applied for an FTM range measurement procedure.

Example 126 includes the subject matter of any one of Examples 116-125, and optionally, wherein the negotiation request message comprises an Initial Fine Timing Measurement (FTM) Request (iFTMR) message, the negotiation response message comprising an FTM response message.

Example 127 includes an apparatus of wireless communication by a responder station, the apparatus comprising means for receiving a negotiation request message from an unassociated initiator station to negotiate a range measurement protocol to perform a range measurement procedure, the negotiation request message comprising an initiator protocol element comprising an indication of one or more initiator range measurement protocols supported by the unassociated initiator station; and means for transmitting a negotiation response message to the unassociated initiator station, the negotiation response message comprising a compatibility indication to indicate whether or not at least one of the initiator range measurement protocols is compatible with at least one responder range measurement protocol supported by the responder station.

Example 128 includes the subject matter of Example 127, and optionally, wherein the compatibility indication comprises a negotiation status indicator comprising either a negotiation success indication or a negotiation failure indication, the negotiation failure indication to indicate that none of the one or more initiator range measurement protocols is compatible with the at least one responder range measurement protocol, the negotiation success indication to indicate that at least one of the initiator range measurement protocols is compatible with the at least one responder range measurement protocol.

Example 129 includes the subject matter of Example 127 or 128, and optionally, comprising means for selecting a selected range measurement protocol from the one or more initiator range measurement protocols, which is supported by the responder station, the negotiation response message comprises a responder protocol element comprising an indication of the selected range measurement protocol.

Example 130 includes the subject matter of Example 129, and optionally, comprising means for determining the selected range measurement protocol based on a preference indicator in the negotiation request message to indicate a preferred range measurement protocol of the one or more initiator range measurement protocols.

Example 131 includes the subject matter of any one of Examples 127-130, and optionally, wherein the negotiation response message comprises a responder protocol parameter element comprising one or more responder range measurement parameter fields corresponding to one or more responder range measurement protocols, a responder range measurement parameter field comprising one or more operating parameters corresponding to a respective responder range measurement protocol.

Example 132 includes the subject matter of Example 131, and optionally, wherein the responder protocol parameter element comprises a common-parameter sub-element comprising one or more common operating parameters to be commonly applied to all responder range measurement protocols.

Example 133 includes the subject matter of Example 132, and optionally, wherein the one or more common operating parameters comprise at least one parameter selected from a group consisting of a number of antennas of the responder station, a measurement type parameter to indicate a type of a measurement for the range measurement procedure, a minimum response time parameter to indicate a minimum response time for the range measurement procedure, a maximum response time parameter to indicate a maximum response time for the range measurement procedure, and an immediate response parameter to indicate whether an immediate response is to be implemented for the range measurement procedure.

Example 134 includes the subject matter of any one of Examples 127-133, and optionally, wherein the one or more initiator range measurement protocols comprise at least one range measurement protocol selected from a group consisting of a Fine Timing Measurement (FTM) protocol, a Very High Throughput-Null Data Packet (VHT-NDP) sounding protocol, a High-Efficiency Wireless (HEW)-NDP sounding protocol, and a 60 Gigahertz (GHz) range measurement protocol.

Example 135 includes the subject matter of any one of Examples 127-134, and optionally, wherein the negotiation request message comprises a Fine Timing Measurement (FTM) element comprising a plurality of FTM parameters to be negotiated for an FTM range measurement procedure.

Example 136 includes the subject matter of any one of Examples 127-135, and optionally, wherein the negotiation response message comprises a Fine Timing Measurement (FTM) element comprising a plurality of FTM parameters to be applied for an FTM range measurement procedure.

Example 137 includes the subject matter of any one of Examples 127-136, and optionally, wherein the negotiation request message comprises an Initial Fine Timing Measurement (FTM) Request (iFTMR) message, the negotiation response message comprising an FTM response message.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising:
   memory circuitry; and
   a processor comprising logic and circuitry configured to cause an initiator wireless communication station (STA) to:
      transmit an initial Fine Timing Measurement (FTM) (iFTM) request message to negotiate a range measurement with a responder STA, the iFTM request message comprising an initiator parameter element corresponding to a Null Data Packet (NDP) based (NDP-based) range measurement protocol, the initiator parameter element comprising one or more initiator parameters for performing the range measurement according to the NDP-based range measurement protocol;
      process an FTM message from the responder STA, the FTM message comprising a status indicator to indicate whether negotiation of the range measurement is successful, wherein the FTM message comprises a responder parameter element comprising one or more negotiated parameters of the NDP-based range measurement protocol for performing the range measurement, wherein the one or more negotiated parameters comprise a negotiated timing parameter to indicate a negotiated timing for the range measurement; and
      based on successful negotiation of the range measurement, perform the range measurement with the responder STA according to the NDP-based range measurement protocol based on the one or more negotiated parameters in the responder parameter element.

2. The apparatus of claim 1, wherein the initiator parameter element comprises a timing parameter to indicate an initiator timing for the range measurement.

3. The apparatus of claim 1, wherein the initiator parameter element comprises a parameter to indicate an Angle of Arrival (AoA) measurement.

4. The apparatus of claim 1, wherein the initiator parameter element comprises an immediate response parameter to indicate whether an immediate response is to be implemented for the range measurement.

5. The apparatus of claim 1 comprising a radio, the processor configured to cause the radio to transmit the iFTM request message.

6. The apparatus of claim 5 comprising one or more antennas connected to the radio, and another processor to execute instructions of an operating system.

7. A product comprising one or more tangible computer-readable non-transitory storage media comprising computer-executable instructions operable to, when executed by at least one processor, enable the at least one processor to cause an initiator wireless communication station (STA) to:
   transmit an initial Fine Timing Measurement (FTM) (iFTM) request message to negotiate a range measurement with a responder STA, the iFTM request message comprising an initiator parameter element corresponding to a Null Data Packet (NDP) based (NDP-based) range measurement protocol, the initiator parameter element comprising one or more initiator parameters for performing the range measurement according to the NDP-based range measurement protocol;
   process an FTM message from the responder STA, the FTM message comprising a status indicator to indicate whether negotiation of the range measurement is successful, wherein the FTM message comprises a responder parameter element comprising one or more negotiated parameters of the NDP-based range measurement protocol for performing the range measurement, wherein the one or more negotiated parameters comprise a negotiated timing parameter to indicate a negotiated timing for the range measurement; and
   based on successful negotiation of the range measurement, perform the range measurement with the responder STA according to the NDP-based range measurement protocol based on the one or more negotiated parameters in the responder parameter element.

8. The product of claim 7, wherein the initiator parameter element comprises a timing parameter to indicate an initiator timing for the range measurement.

9. The product of claim 7, wherein the initiator parameter element comprises a parameter to indicate an Angle of Arrival (AoA) measurement.

10. The product of claim 7, wherein the initiator parameter element comprises an immediate response parameter to indicate whether an immediate response is to be implemented for the range measurement.

11. An apparatus comprising:
    memory circuitry; and
    a processor comprising logic and circuitry configured to cause a responder wireless communication station (STA) to:
       process an initial Fine Timing Measurement (FTM) (iFTM) request message from an initiator STA to negotiate a range measurement with the responder STA, the iFTM request message comprising an initiator parameter element corresponding to a Null Data Packet (NDP) based (NDP-based) range measurement protocol, the initiator parameter element comprising one or more initiator parameters for performing the range measurement according to the NDP-based range measurement protocol;
       set a status indicator to indicate whether negotiation of the range measurement is successful based on the iFTM request message;
       transmit an FTM message to the initiator STA, the FTM message comprising the status indicator, wherein the FTM message comprises a responder parameter element comprising one or more negotiated parameters of the NDP-based range measurement protocol for performing the range measurement, wherein the one or more negotiated parameters comprise a negotiated timing parameter to indicate a negotiated timing for the range measurement; and
       based on successful negotiation of the range measurement, perform the range measurement with the initiator STA according to the NDP-based range measurement protocol based on the one or more negotiated parameters in the responder parameter element.

12. The apparatus of claim 11, wherein the initiator parameter element comprises a timing parameter to indicate an initiator timing for the range measurement.

13. The apparatus of claim 11, wherein the initiator parameter element comprises a parameter to indicate an Angle of Arrival (AoA) measurement.

14. The apparatus of claim 11, wherein the initiator parameter element comprises an immediate response parameter to indicate whether an immediate response is to be implemented for the range measurement.

15. The apparatus of claim 11 comprising a radio, the processor configured to cause the radio to transmit the FTM message.

16. The apparatus of claim 15 comprising one or more antennas connected to the radio, and another processor to execute instructions of an operating system.

17. An apparatus comprising:
   means for causing a responder wireless communication station (STA) to process an initial Fine Timing Measurement (FTM) (iFTM) request message from an initiator STA to negotiate a range measurement with the responder STA, the iFTM request message comprising an initiator parameter element corresponding to a Null Data Packet (NDP) based (NDP-based) range measurement protocol, the initiator parameter element comprising one or more initiator parameters for performing the range measurement according to the NDP-based range measurement protocol;
   means for causing the responder STA to set a status indicator to indicate whether negotiation of the range measurement is successful based on the iFTM request message;
   means for causing the responder STA to transmit an FTM message to the initiator STA, the FTM message comprising the status indicator, wherein the FTM message comprises a responder parameter element comprising one or more negotiated parameters of the NDP-based range measurement protocol for performing the range measurement, wherein the one or more negotiated parameters comprise a negotiated timing parameter to indicate a negotiated timing for the range measurement; and
   means for causing the responder STA to, based on successful negotiation of the range measurement, perform the range measurement with the initiator STA according to the NDP-based range measurement protocol based on the one or more negotiated parameters in the responder parameter element.

18. The apparatus of claim 17, wherein the initiator parameter element comprises a parameter to indicate an Angle of Arrival (AoA) measurement.

* * * * *

UNITED STATES PATENT AND TRADEMARK OFFICE
CERTIFICATE OF CORRECTION

PATENT NO.        : 11,330,086 B2
APPLICATION NO.   : 16/793235
DATED             : May 10, 2022
INVENTOR(S)       : Venkatesan et al.

It is certified that error appears in the above-identified patent and that said Letters Patent is hereby corrected as shown below:

On the Title Page

Item (71), delete "INTEL IP CORPORATION, Santa Clara, CA (US)" and insert -- INTEL CORPORATION, Santa Clara, CA (US) --, therefor Signed and Sealed this
Nineteenth Day of July, 2022

Katherine Kelly Vidal
*Director of the United States Patent and Trademark Office*